Jan. 5, 1932.   R. H. LAWSON   1,839,852
MACHINE FOR OPERATING UPON SHOES
Filed Feb. 4, 1926   12 Sheets-Sheet 1

Jan. 5, 1932.    R. H. LAWSON    1,839,852
MACHINE FOR OPERATING UPON SHOES
Filed Feb. 4, 1926    12 Sheets-Sheet 5

INVENTOR-
Robert H. Lawson
By his Attorney,
Nelson W. Howard

Jan. 5, 1932.    R. H. LAWSON    1,839,852
MACHINE FOR OPERATING UPON SHOES
Filed Feb. 4, 1926    12 Sheets-Sheet 6
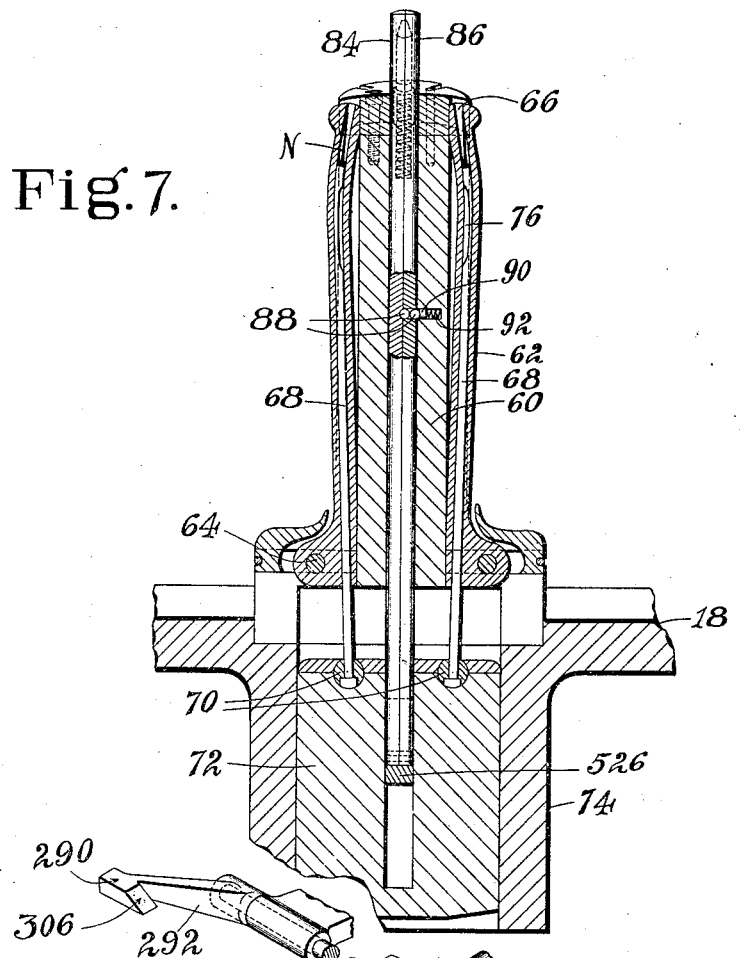
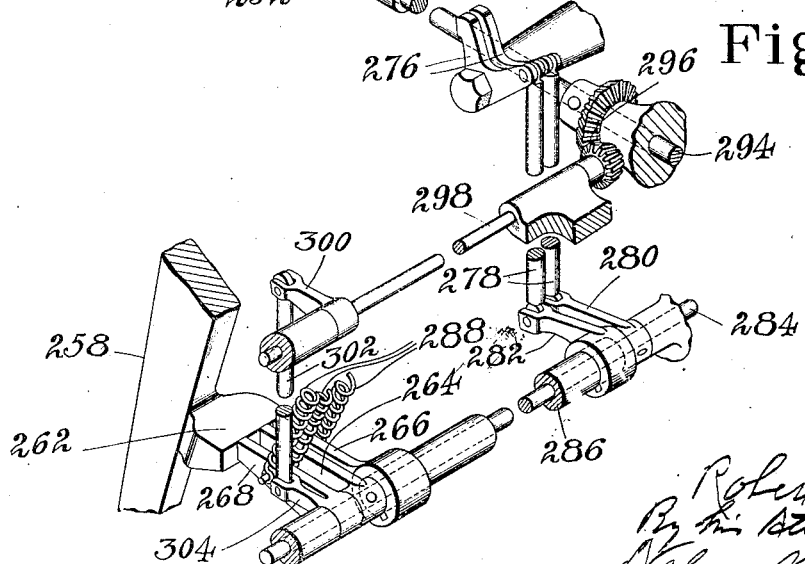
INVENTOR-
Robert H. Lawson
By his Attorney
Nelson M. Howard Jan. 5, 1932.        R. H. LAWSON        1,839,852
MACHINE FOR OPERATING UPON SHOES
Filed Feb. 4, 1926        12 Sheets-Sheet 7
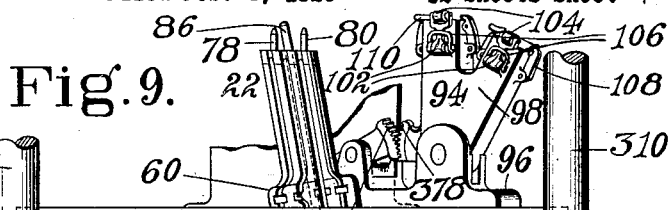
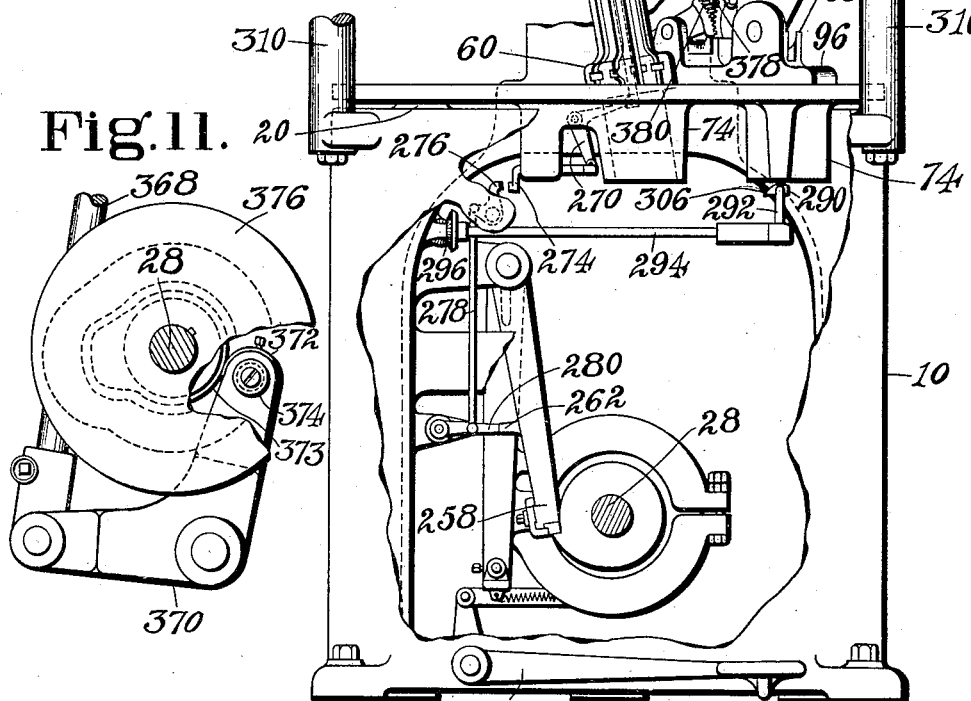
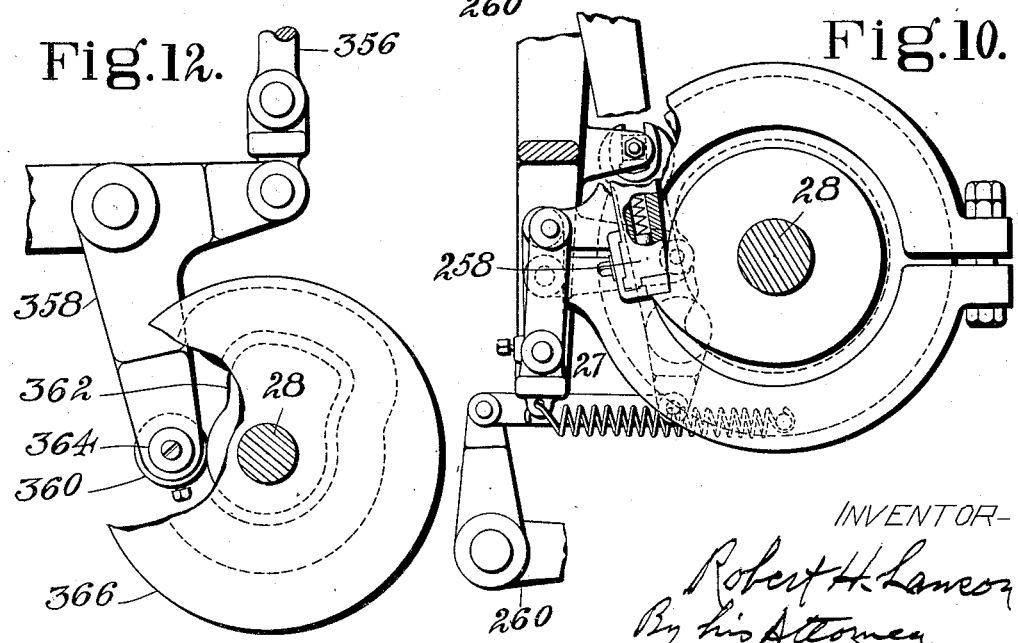

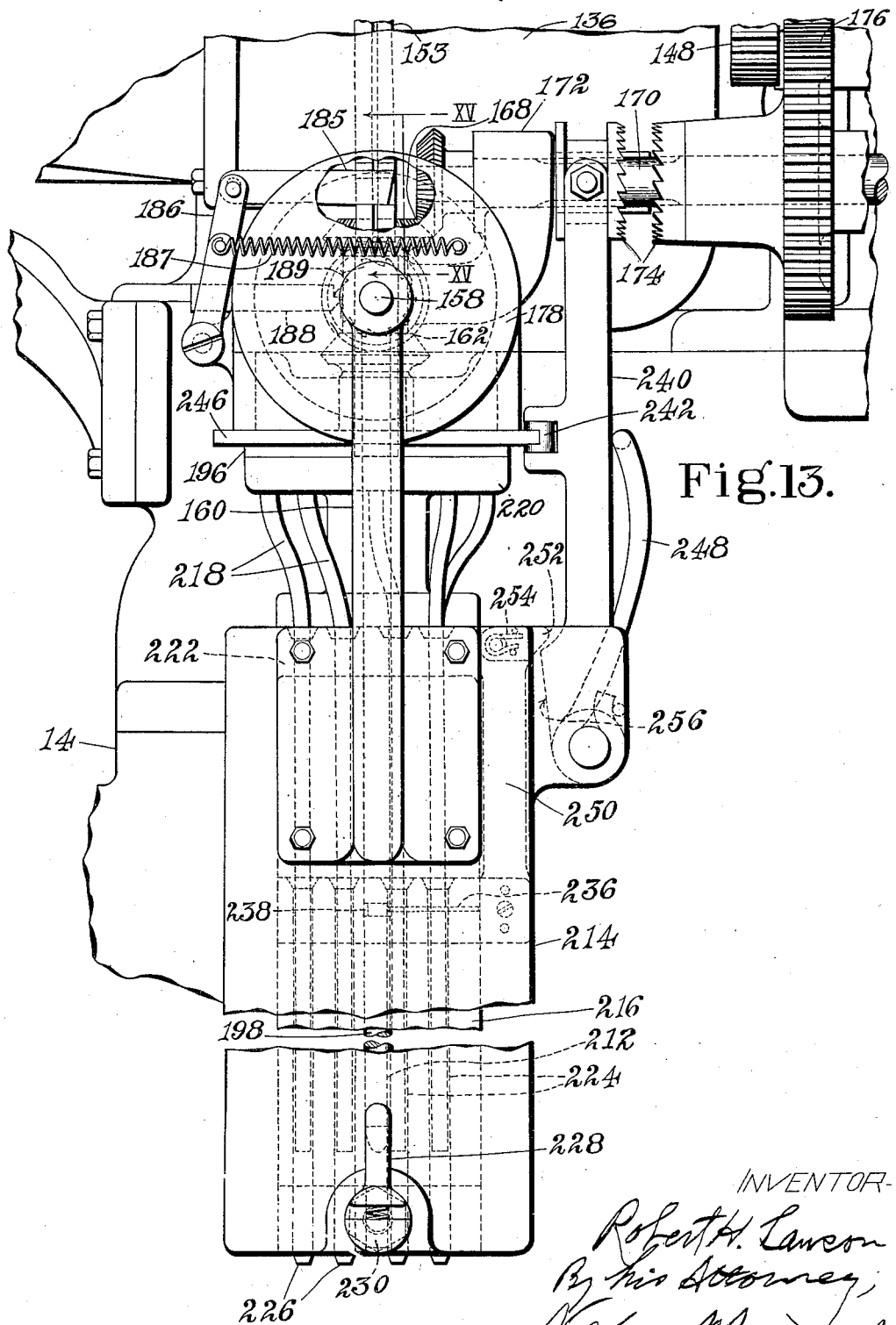

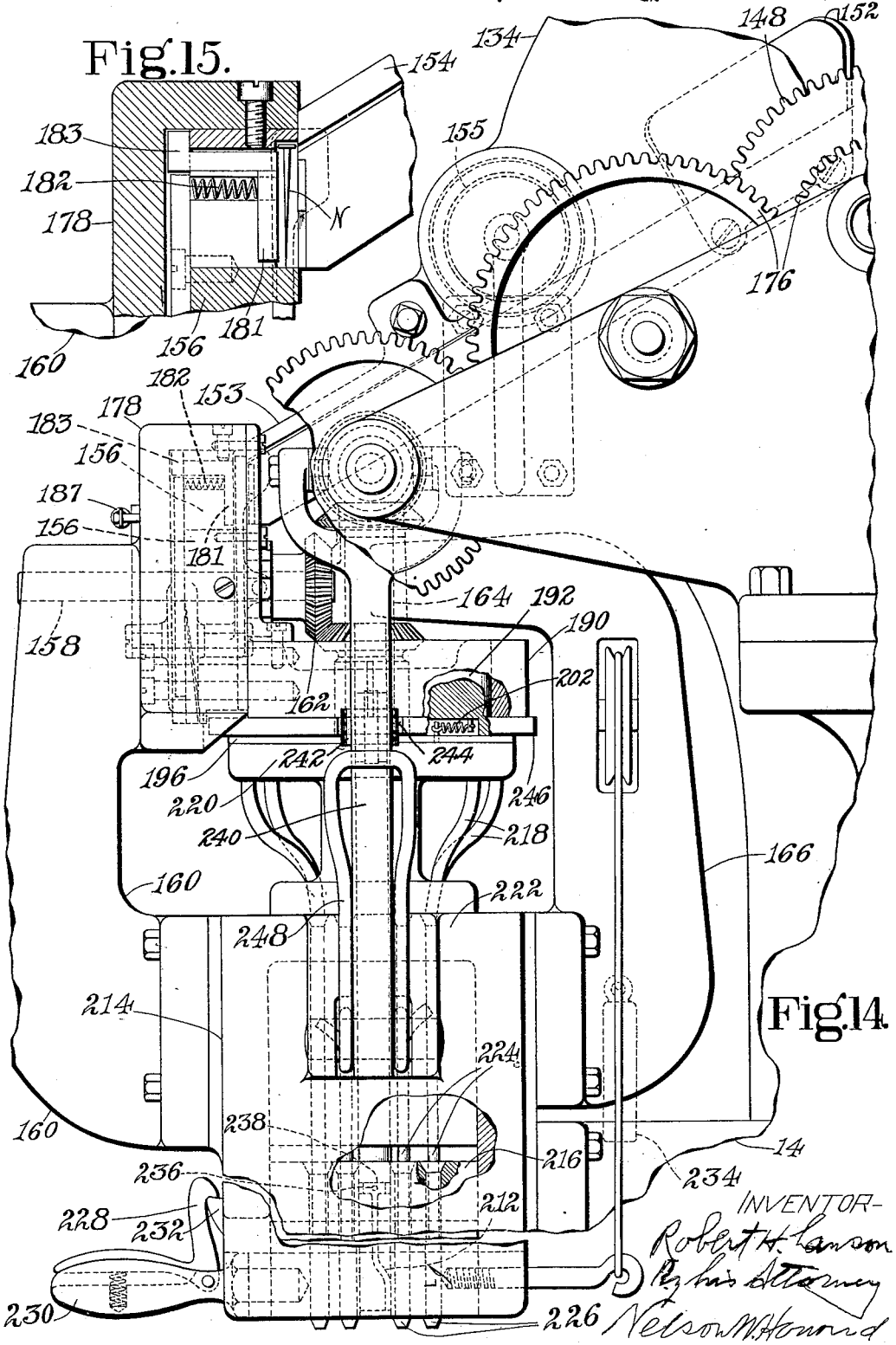

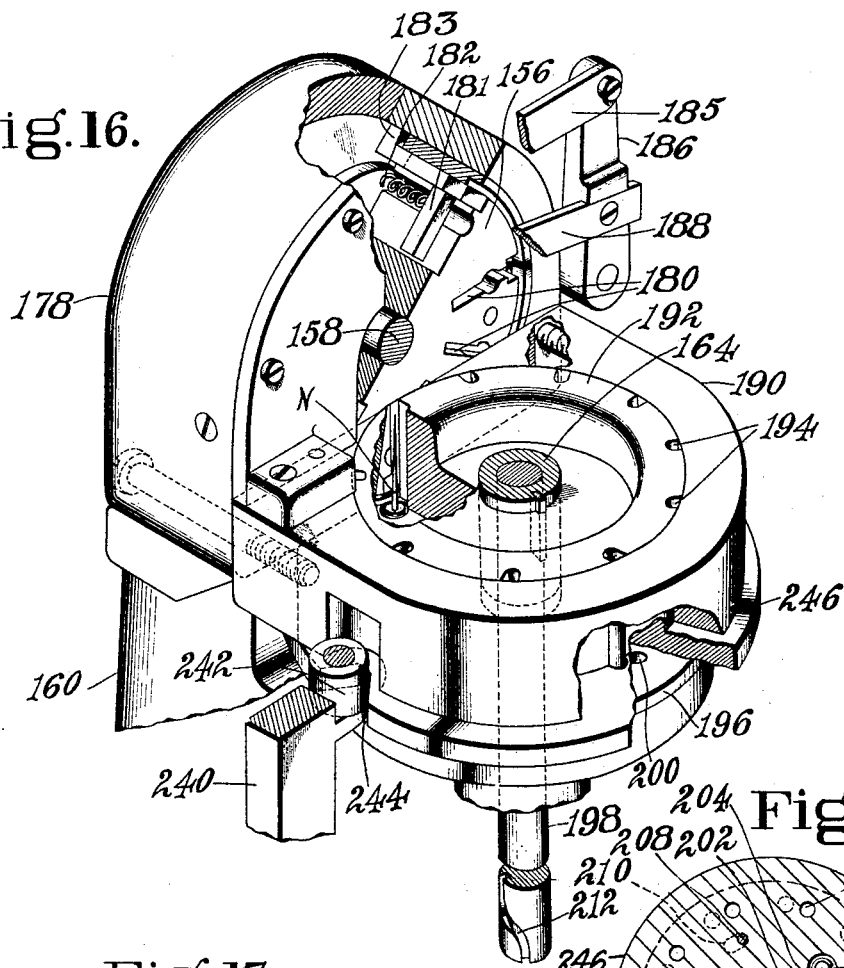
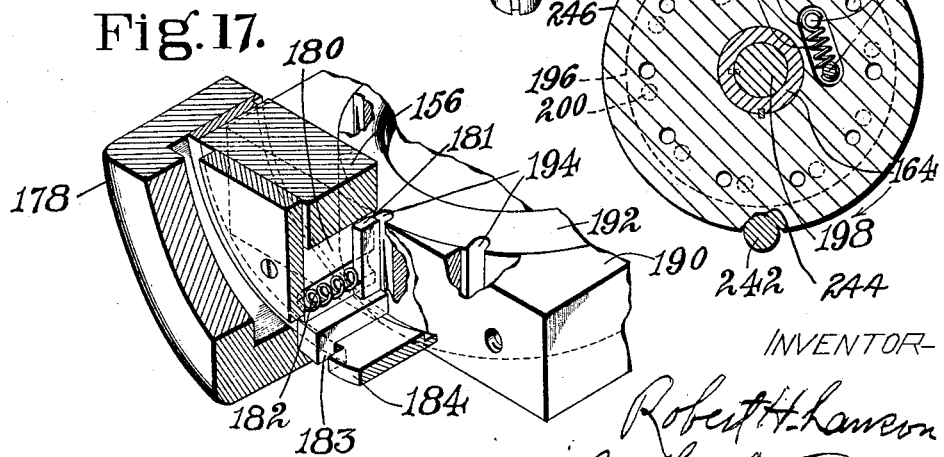

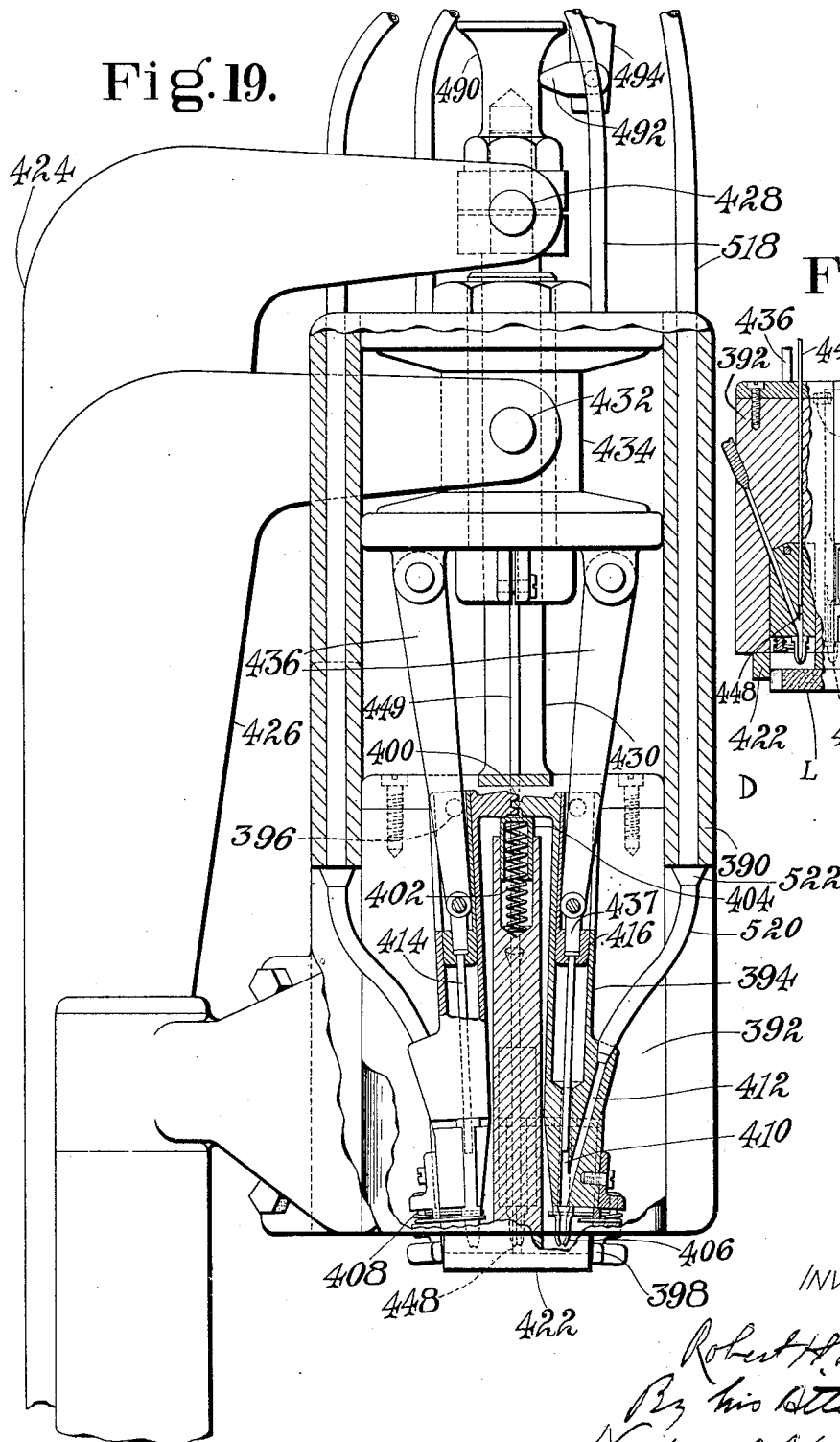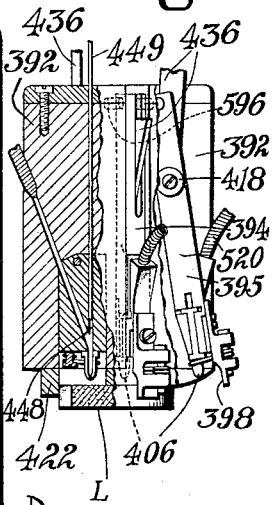

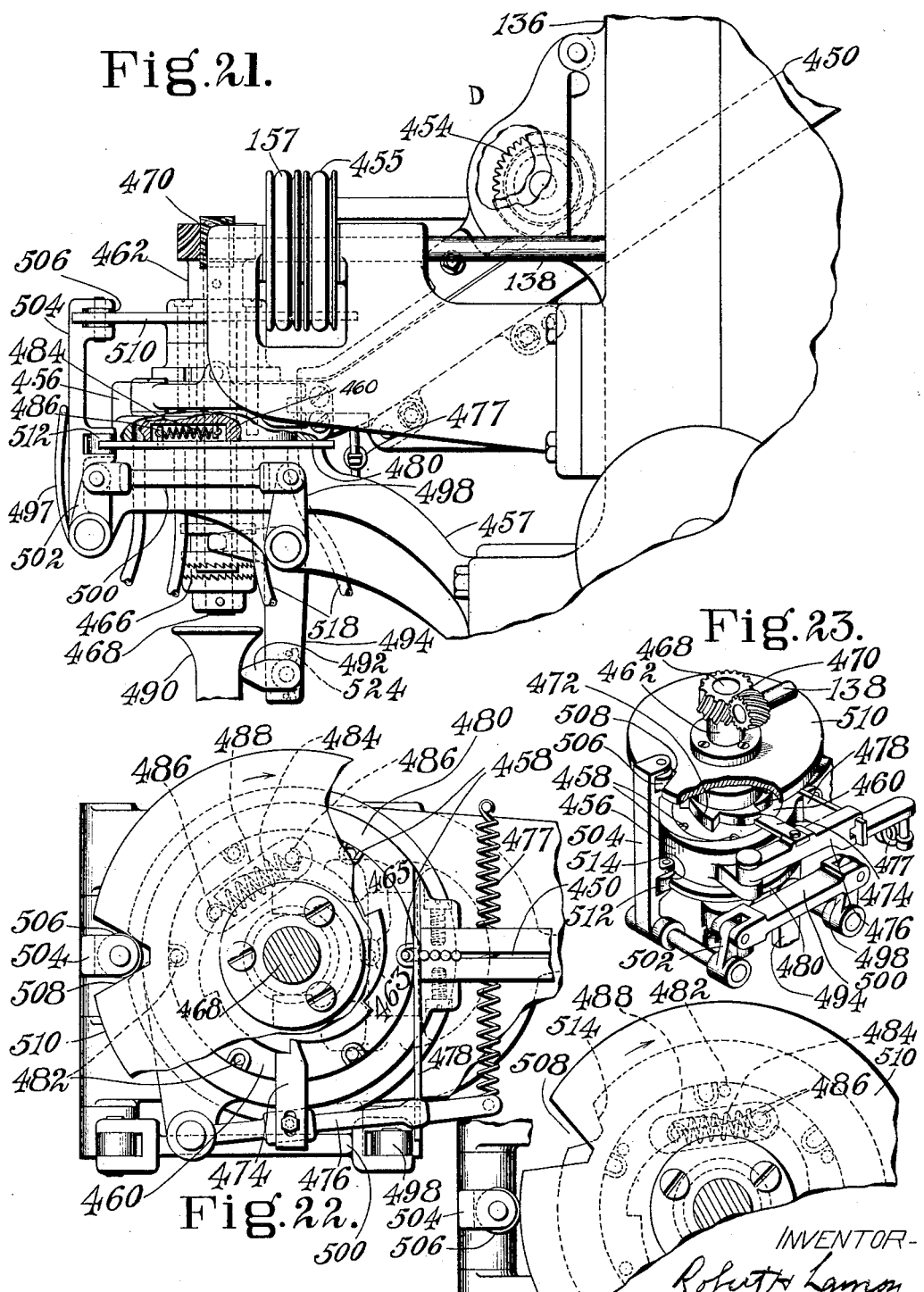

Patented Jan. 5, 1932

1,839,852

UNITED STATES PATENT OFFICE

ROBERT H. LAWSON, OF BEVERLY, MASSACHUSETTS, ASSIGNOR TO UNITED SHOE MACHINERY CORPORATION, OF PATERSON, NEW JERSEY, A CORPORATION OF NEW JERSEY

MACHINE FOR OPERATING UPON SHOES

Application filed February 4, 1926. Serial No. 86,073.

The present invention relates to machines for operating upon shoes, being herein illustrated as embodied in an apparatus for butting or trimming the ends of a welt adjacent to the breast-line of a heel which is to be attached and for effecting the attachment of such heel.

An object of the invention is to furnish an effective machine in which various operations are successively performed without the intervention of an operator, other than the supplying of the work to the machine and its removal when completed. When the welt is to be operated upon, or prepared for co-operation with a heel, this is done on a support at an operating position, after which the support travels to another position, where a further operation, as the attachment of a heel, is carried on. This procedure may advantageously be performed by the use of a rotatable turret to transfer the work from position to position, the supports taking the form of jacks mounted upon the turret, so there is one at each operating position. The trimming action is obtained in the present instance by a cutter movable transversely of the path of revolution of the support. Whether or not the welt is to be operated upon, the traveling work-support preferably has attaching mechanism, as nail-driving units, movable with it. These units may be operated at one position to cause the attachment of a heel-portion, as a base, while another heel-portion, as a top-lift, may be attached at a succeeding position by mechanism situated thereat.

Since nails or other fastenings are preferably driven into the work upon the traveling support at a plurality of operating positions, it is a further object of my invention to efficiently accomplish their delivery. To this end, I utilize means common to such plural positions for supplying thereto the desired fastenings. In the present embodiment of the invention, the supply at one position is to the support, while at another it is to inserting mechanism located at the position. In one instance, the delivery may be under the control of the operator, another delivery being governed by the machine in its operation. Reversal of the fastenings preferably occurs during delivery at one position.

Because of the automatic character of the machine, it is important that means shall be provided for accurately locating work-portions upon the support after they have left the operator's hands. This I accomplish by providing said support with a plurality of such positioning devices as projections arranged to enter corresponding openings in the portions. To this positioning means the portions are presented at different operating positions, and are held in predetermined relation to the support and to each other until the operations have been completed.

Another object of the invention is to furnish simple and reliable means for supplying work-portions for the operations upon them. As herein disclosed, these portions, as a heel-base and a top-lift, are applied by an operator at one position to a holder traveling with the support, from which holder the work-portions are received and presented to the support, which may also have had a work-portion applied to it by the operator. The receiving and presenting means is preferably a portion of fastening-inserting mechanism, and may act at plural positions, as those at which the heel-base and top-lift are respectively attached. Most effectively, a holder acts as a support for both these work-portions, and, to permit this, is movable in the operation of the machine.

In such operations as the attachment of heels by fastenings driven from the inside of shoes, it is desired to locate the fastenings as near as possible to the periphery of the heel, to obtain a tight rand-crease. It is, of course, essential that the thus-inserted fastenings shall not break through the heel-wall. It is an object of my invention to obtain these results, and this object I achieve by the use of an operating mechanism, including a carrier member or tube movable upon a jack or support and provided with a passage curved or varying in its direction of longitudinal extension, and a flexible fastening-driver or tool preferably consisting of an integral member movable longitudinally of the passage. Because of its form, the carrier may be forced against the interior of the counter-portion of the shoe under the influence of the driver-movement, yet will insure the proper direction of insertion of the fastenings which it contains. The flexibility of the driving tool allows it to conform to the contour of the passage. By reducing the diameter of this driver adjacent to its operating extremity, I compel it to maintain a constant angular relation in the containing passage, so that it offers a minimum resistance to its actuating member or plunger and with little tendency to deteriorate.

A further object of my invention is to furnish means cooperating with the support to bring about the attachment to the supported work of portions which are to complete it. In the attachment of a heel-base, for example, in connection with which the nails are driven from a jack or support at a particular position to which it travels, there is at this position a pressure member, against which, as an abutment, the driving is done. I also may employ at this position a driver-actuator, which will serve a plurality of jacks successively arriving at the position, as under the influence of a rotatable turret. In lift-attachment, pressure is preferably applied to the work by movement of a head cooperating with the supporting jack, a fastening-inserting driver being movable with the head and there being continued movement of one of the elements independently of the other. The head thus holds the work under pressure while the driver or drivers advance to insert the fastenings. I preferably cause certain of the driver-units, which are mounted at one end to move upon the head, to be constantly forced inwardly at their work-engaging ends, so they may hold between them a heel-lift ready for its attachment. As the lifts and bases, in accordance with my invention, are delivered to the nailing head by a traveling holder, a path must be furnished by which the lifts may arrive between the engaging portions of the driver-units. For this purpose, I arrange a portion of the fastening-inserting means, shown as consisting of a tube containing a driver, to be moved out of the path of the heel-portion, while other of such units remain in position for engagement with the heel-portion, to retain it as it is removed from its holder by contact with some such means as an abutment carried by the head. The movement of the driver-tube to clear the path of the heel-portion may be under the influence of the driving action as a result of frictional connection between the driver and tube. The engagement of the other inserting units with the heel-portion may be brought about by spring-pressure.

Still another object of the invention is to insure that the shoe-parts which are to be operated upon shall be in place before the machine is started. This I achieve by making effective connection between the operating mechanism or mechanisms of the apparatus and the actuating means therefor, dependent upon the presence of the shoe-parts upon or in their supports or holders. I prefer to have a locking member corresponding to each of the parts which are to govern the starting, these members acting to prevent movement of an element included in the connecting means between the operating mechanism and actuating mechanism. When a shoe-part is in place upon its support, its locking member releases the connecting element, and when all the parts are supplied, complete release of such element is had, and the machine may be put in action.

The work, upon completion, may be in such engagement with its support that it would be difficult for the unaided operator to dislodge it, this being particularly true when locating devices are employed upon the jack. It is an object of this invention to facilitate removal of the work, and for this purpose there is provided means movable against the work to free it. I may utilize a member which controls the operation of the machine, as a result of the application of work-portions to the support. More specifically, in a turret type of machine, each traveling jack may have movable in it one or more members, such as rods, which, in the rotation of the turret, are forced against the heel-seat of a jacked shoe to release it from projections or other locating devices. One of the many embodiments which my invention may assume is illustrated in the accompanying drawings, in which Fig. 1 is a top plan view of my improved machine, portions being broken away;

Fig. 7 is a section through the jack, taken on the line VII—VII of Fig. 5;

Fig. 8 illustrates, in perspective, a portion of the mechanism for locking and unlocking the starting treadle of the machine;

Figure 4:
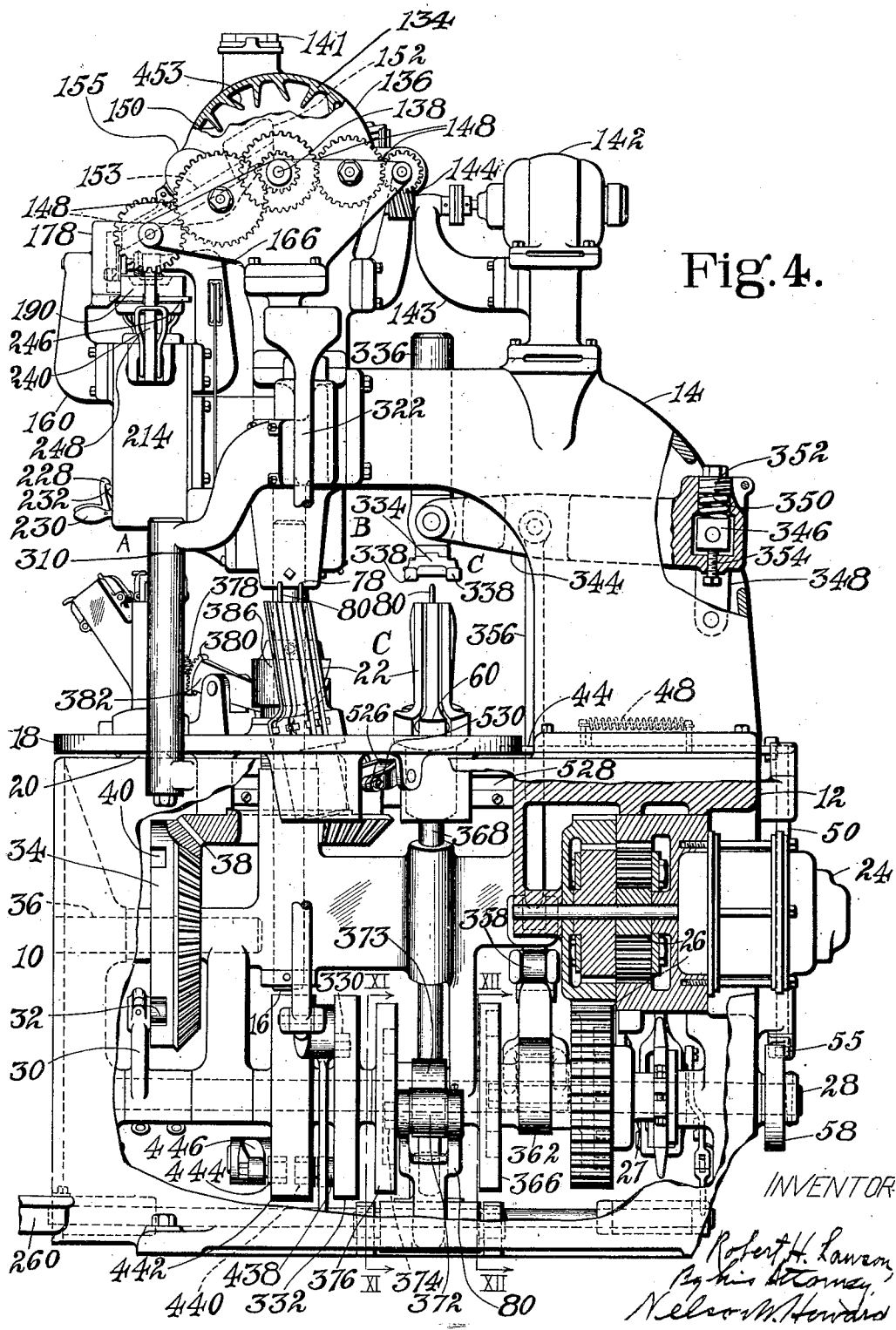
Fig. 4 is a broken side elevation looking from the right in Fig. 3.

Fig. 9 further illustrates the locking and unlocking mechanism, being a transverse section through the driving mechanism, taken at one side of the clutch;

Fig. 10 shows the clutch enlarged and viewed similarly to Fig. 9, parts being broken away;

Figs. 11 and 12 are sectional details on the lines XI—XI and XII—XII, respectively, of Fig. 4;

Fig. 13 is an enlarged front elevation of the nail-loading mechanism at the work-receiving station, together with a portion of the distributing mechanism;

Fig. 14 shows the same elements in side elevation, viewed from the right in Fig. 13;

Fig. 15 is a sectional detail on the line XV—XV of Fig. 13;

Fig. 16 illustrates, in broken perspective, the nail-receiving and reversing and the nail-delivering disks of the distributing mechanism at the work-receiving station;

Fig. 17 illustrates, in broken perspective, co-operating portions of the nail-disks of Fig. 16;

Fig. 18 is a horizontal section taken just above the shutter of Fig. 16;

Fig. 19 shows, in broken side elevation, the lift-nailing mechanism at the lift-attaching station;

Fig. 20 is a broken side elevation of the mechanism of Fig. 19, looking from the right;

Fig. 21 is a broken side elevation of the distributing mechanism at the lift-attaching station;

Fig. 22 is a horizontal section taken just above the nail-receiving and delivering disk of Fig. 21;

Fig. 23 shows said disk and closely associated elements in perspective; and

Fig. 24 is a sectional detail taken in the same plane as Fig. 22, with the elements in different relation.

The frame of the apparatus includes a base 10 furnishing an enclosure as well as a support for the chief driving and actuating elements, it being generally in the form of a vertical cylinder provided with a rearward extension 12, from which projects upwardly and forwardly a frame-arm 14 (Fig. 4) overhanging the base. Mounted vertically at the center of the base 10 and held at its upper extremity in the frame-arm is a shaft or spindle 16, about which rotates a carrier-turret consisting of a horizontal plate 18. This plate moves at its under side, with slight clearance, above portions 20 of the base, which are separated from one another by substantially ninety degrees. These base-portions give support for the turret under the pressures of the various operating mechanisms, the yield of the plate 18 bringing it into contact with said portions to positively resist further displacement.

Mounted upon the upper face of the turret-plate are four jacks or work-supports 22 situated ninety degrees apart and caused to revolve in the rotation of the turret to four successive stations A, B, C and D, and to stop for a predetermined time at each station to permit different operations to be performed upon a jacked shoe. At station A, the work may initially be applied to the jack and to holding elements which co-operate with it, and said work removed at the completion of a cycle of the machine; at station B, the ends of a welt associated with an upper placed upon the jack at station A may be butted or trimmed, together with the adjacent corners of the outsole; at station C, a heel-base may be attached to the heel-seat-portion of the shoe upon the jack; while at station D, a lift of rubber or other material may be secured to the base. As best shown in Fig. 4, power is applied to the turret from a motor 24 situated at the rear of the frame, which motor drives, through reduction-gearing 26 and a clutch 27, preferably of the Horton type, a shaft 28 journaled near the lower portion of the base and extending from front to rear thereof. Fixed upon the forward extremity of the shaft 28 is an arm 30 having a roll 32 co-operating with a Geneva gear 34 (Fig. 3) fast upon a shaft 36 rotatable in the base above the shaft 28. Bevel-gearing 38 joints the Geneva gear to the turret 18. By each entrance of the roll 32 into one of four radial slots 40, spaced equally about the Geneva gear 34, said gear is turned through ninety degrees, and the turret-plate 18 correspondingly rotated. This effects the travel of each jack from one station to the next.

Figure 2:
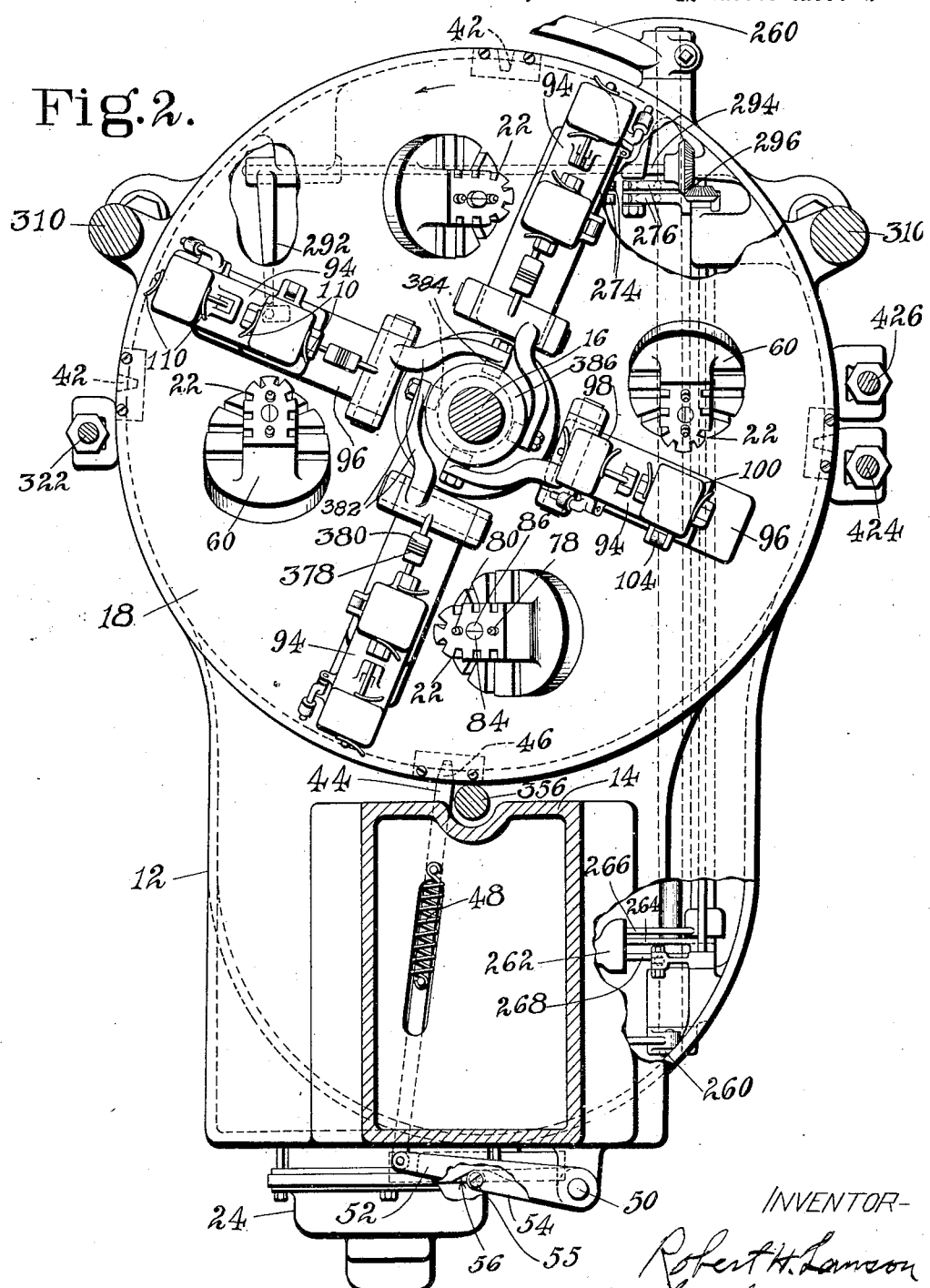
Fig. 2 is a horizontal section taken just above the jacks.

To insure the correct positioning of the jacks at the stations and their retention throughout the operations to be performed, locking and registering mechanism is provided. Seperating from one another about the periphery of the turret, in the same angular relation as the jacks, are four conical recesses 42 (Fig. 2). Mounted to slide horizontally in the frame and in the plane of the recesses is a locking bar 44, the inner end of which is inclined at 46 to enter the recesses. This engaging end of the bar is drawn toward the turret by a spring 48 connecting the bar and base-extension 12. Arranged to turn vertically at the rear of the base is a spindle 50 having at its top an arm 52 joined to the bar. At the bottom of the spindle is secured an arm 54, upon which is a roll 55 contacting with a cam-face 56 upon a disk 58 fast upon the rear extremity of the shaft 28. The contour of the cam is such that, during the rotation of the turret by the Geneva gear, the bar will be held clear of the recesses 42. When the movement of the turret stops, the cam allows the spring 48 to draw the end 46 of the bar into the recess at that time alined with it. This engagement not only holds the turret against displacement, but also, by the co-operation of the inclined surfaces upon the bar and plate-edge, brings the elements carried by the turret into exactly the proper relation to the mechanisms at each of the operating stations.

Figure 5:
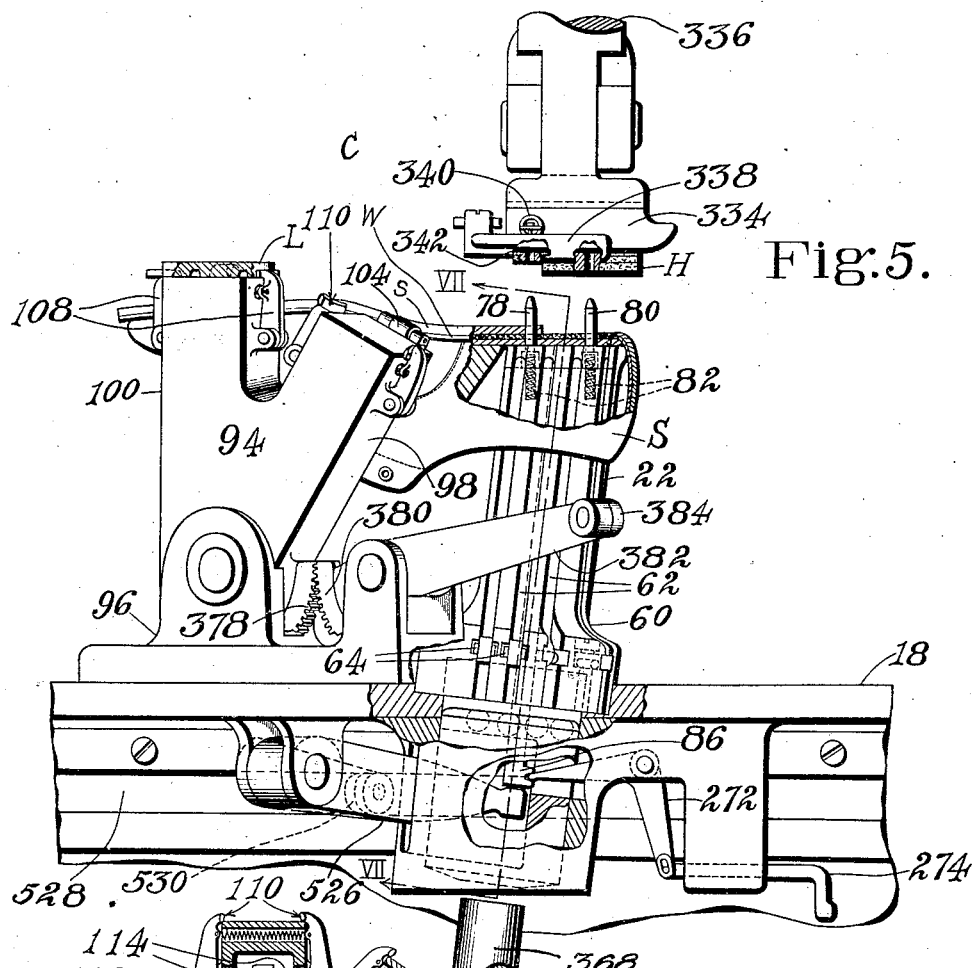
Fig. 5 shows a jack in side elevation, together with the more closely associated elements at the base-nailing station.

One of the four jacks 22 carried by the turret is best illustrated in Figs. 5 and 7 of the drawings. Seated in each of four recesses in the turret-plate is a jack-body 60, the upper end of which is formed to fit the counter and heel-seat-portion of a shoe. In vertical grooves along the body, eight of these grooves being shown in each jack (Fig. 2), normally rest carrier members furnished by driver- and nail-tubes 62, each of these units being pivoted at 64 in the lower enlarged base-portion of the body. Each tube is preferably straight at its lower portion, but varies in direction as it extends longitudinally, the upper end being curved inwardly so that it generally conforms to the curvature of the counter-portion of a shoe and also directs the nails to be driven toward the vertical axis of the heel which they attach. This insures that the nails shall not emerge from the periphery of the heel, even if their points of insertion are close to the rand-crease. Extending longitudinally of each tube is a passage 66, the contour of which corresponds to that of the tube, as just described. In each of the tube-passages operates a driver or fastening-inserting member 68 consisting of an integral flexible rod connected at its lower end by a universal joint 70 to a plunger 72 sliding in a passage formed in a depending portion 74 of the turret. Like the containing passage 66, the driver is preferably cylindrical in transverse section, except just below the upper extremity or head. Here the driver is recessed, being substantially reduced in thickness by having a portion cut away at one side at 76. This increases the flexibility of the driver, to permit it to follow the curvature of the tube, and causes it to rotate if displaced angularly about its universal joint from the position shown in Fig. 7, the reduced portion tending to remain always toward the axis of curvature. As a result of this, the area of greatest pressure, which is at the outside of the tube, receives the contact of an unbroken surface; there is no tendency to score the tube-wall by the edges of the reduced portion; the resistance to bending is minimized; and there is little breakage of drivers because of this bending. Normally, the drivers are held lowered, as by the weight of the elements, particularly the plunger, so that the upper ends of the drivers are far enough below the tops of the tubes to leave space in the passages for the reception of the nails N to be driven. These nails rest with their heads upon the upper extremities of the drivers, the contact-faces lying at such angles to the axes of the drivers that the nails will be inserted in the desired directions.

Rising from the upper surface of each jack are work-locating pins or projections 78 and 80 (Fig. 5), though another number than two might be employed, these being spaced from one another along the longitudinal axis of a shoe when supported upon the jack. A shoe S to be operated upon is shown as having a short sole s, and through the heel-seat-portion of the insole are two openings arranged to receive the pins when the shoe is correctly placed upon the jack for the operations upon it. The inner opening comes just within the outsole s, so that the correct relation between this and the attached heel is insured. A heel-base H and a top-lift L, the latter being preferably of yieldable material, as rubber, contain openings also corresponding to the spacing of the pins. The base-openings pass entirely through this shoe-portion, so that the pins 78 and 80 may project beyond it and enter the lift-openings, which terminate short of the tread-surface. Because of the engagement of the jack-pins with the insole, outsole, base and top-lift, all these portions are assembled in correct and unvarying relation without the necessity for special consideration on the part of the operator. Each of the jack-pins is shown as provided with a tapered upper end to facilitate the application of the work-portions, and is yieldable downwardly against a spring 82 seated in a recess in the jack-top beneath the pin. This allows said pin to adapt itself to the work vertically and be used without change for different thicknesses of heel-portions.

Extending substantially along the axis of the jack is a passage, in which are two rods 84 and 86 (Fig. 7). Each of these rods may be semi-cylindrical, they lying with their flat faces in contact and their curved sides conforming to the transverse section of the passage. Before a shoe is jacked, the rods are held with their upper extremities horizontally alinged above the work-engaging face of the jack-top by a retaining device, here illustrated as consisting of two balls 88, 88 operating in a horizontal passage in the rod 86 and in an alined passage in the jack-body. The inner ball also normally extends into a slight depression in the rod 84. A plunger 90, backed by a spring 92, is contained in the body-recess, urging both balls into the passage in the rod 86, with the inner ball in contact with the rod 84. These rods act both to control the starting of the machine and to free the shoe from the jack after the operations upon said shoe have been completed. The action in both cases will later be developed fully.

Figure 6:
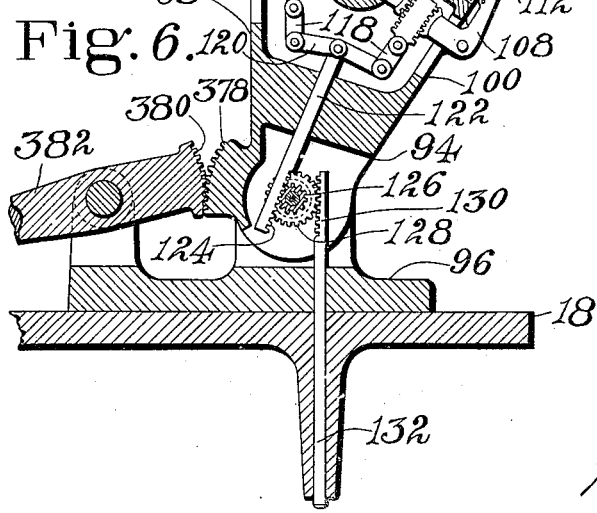
Fig. 6 is a vertical transverse section through the base- and lift-holder which cooperates with the jack.

Carried upon the turret, in advance of each jack, is a combined heel or base and top-lift-holder (see particularly Figs. 2, 5 and 6), upon which these shoe-bottom parts are temporarily supported for later presentation to a jacked shoe. The body 94 of this holder is pivoted upon a base 96 fixed to the upper face of the turret. It is bifurcated, having one arm 98 with an upper end surface, upon which may rest the heel-base H, and the other arm 100 with a surface to receive the top-lift L. At the rear of each of the receiving surfaces is a yieldable abutment including an arm 102 (Fig. 9) pivoted upon the vertical forward face of the holder and carrying a contact-roll 104 projecting above the receiving surface. A spring 106 urges the lever inwardly toward the holder, but permits it to yield when the proper force is applied. Fulcrumed at opposite sides of the receiving surface of each holder-portion are bell-crank levers 108 having engaging surfaces 110 for grasping the shoe-portions which are to be held. Springs 112, extending through openings just below the receiving surfaces of the holder-portions, draw the engaging surfaces toward one another, so that they will be adapted to clamp between them heel-bases and lifts of different widths, and to yield for the release of these elements. The lower arms of the bell-crank levers have formed upon them gear-segments 114, which mesh with opposite teeth upon a rack-bar 116 movable within a chamber in the holder. Links 118 join the rack-bars to the opposite extremities of a floating lever 120 articulated at its center to a slide 122 guided in the holder-body and provided near its lower end with rack-teeth 124. A pinion 126, engaging the rack-teeth 124, is mounted to turn at the bottom of the body 94, and imparts rotation to a gear 128 co-operating with rack-teeth 130 upon a contact-slide 132 movable vertically in the turret. This slide 132 acts with the rods 84 and 86 to govern the engagement of the driving mechanism of the machine in a manner to be described.

Since, in the present embodiment of the invention, the heel-attachment is to be by nails driven from within shoes through the heel-seats, such nails must be supplied to the passages 66 before a shoe is jacked. This may be effected by a distributing mechanism and a loading mechanism, shown in the assembly views of Figs. 1, 3 and 4, and in detail in Figs. 13 to 17, inclusive. The distributor, which may also supply the lift-attaching nails at station D, is supported at one side of the frame-arm 14, and includes a nail-receptacle consisting of a rotatable drum 134 provided with a fixed end or head 136. The drum has a shaft 138 journaled in the head and in a bracket 140. Nails may be supplied to the drum through an opening situated at the top of the head 136 and normally closed by a hinged cover 141. A slow movement of rotation is imparted to the drum, from a motor 142 held upon a bracket 143, through spiral gearing 144 driving a shaft 146 carried in bearings transversely of the arm 14 and connected to the distributor-shaft 138 by a chain of spur-gearing 148. About the interior of the drum is spaced the usual series of buckets 150, by which the nails are raised from the mass at the bottom and delivered upon an inclined receiving plate 152 attached to one side of a raceway or nail-conveyor 153. The raceway is slotted to convey the nails in a series, hanging by their heads, and passes downwardly in an inclined direction through the side wall of the head 136. To prevent the nails from clogging in the raceway, there is shown as rotatable above it, upon a shaft 154, a toothed rake-wheel 155 driven by belt-gearing 157 from the shaft 146. The direction of rotation of the wheel 155 adjacent to the raceway is upward, causing its teeth to engage and separate the descending nail-heads, and thus free them from one another for their downward travel.

Figure 1:
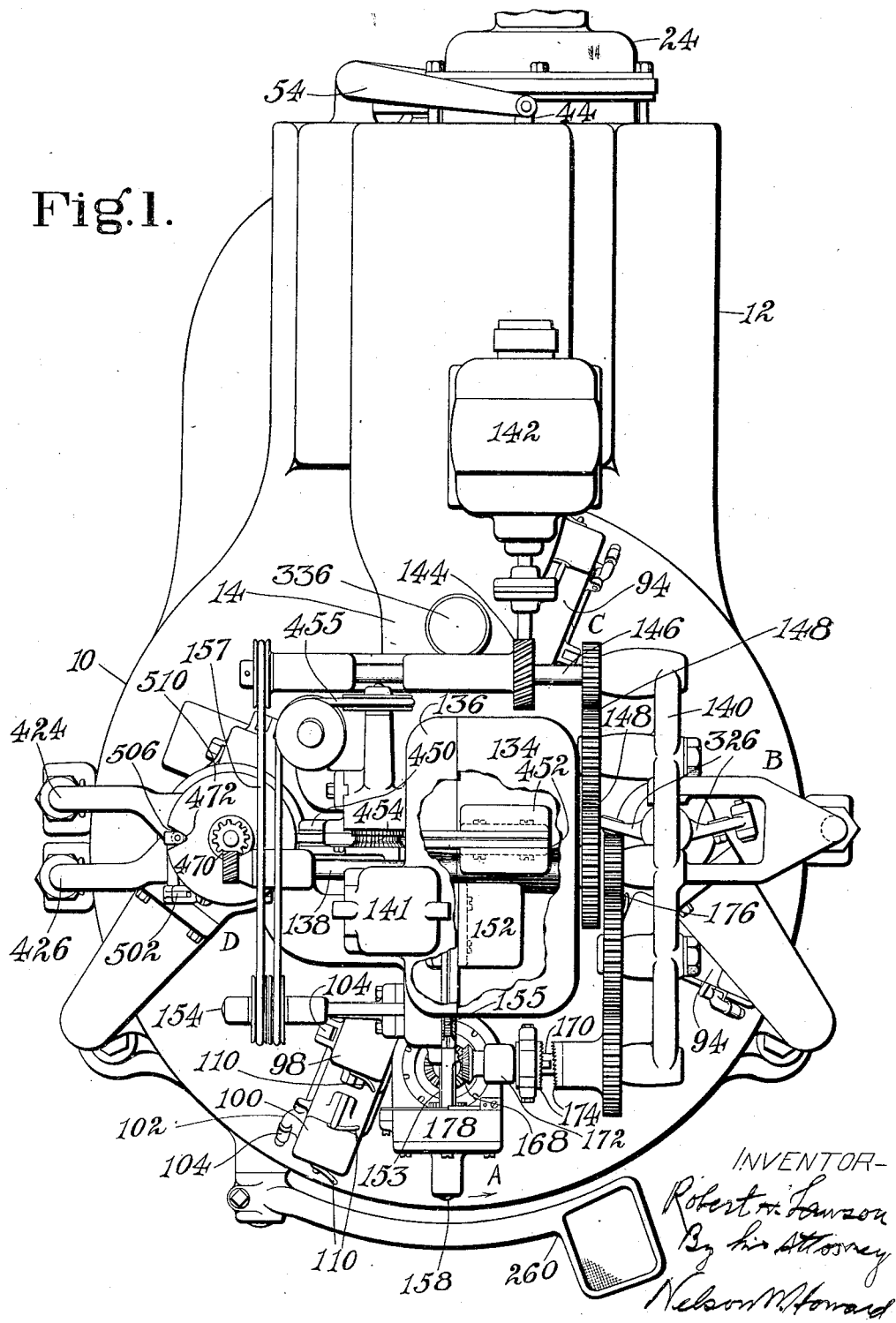

The raceway 153 terminates against the vertical face of a nail-receiving and reversing disk 156 (Fig. 16). This disk rotates with a horizontal shaft 158 upon a bracket 160 (Fig. 14), which is mounted at the forward extremity of the frame-arm 14. Bevel-gearing 162 joins the shaft 158 to a vertical tubular shaft 164 journaled in a bracket 166 rising from the frame-arm. Bevel-gearing 168 connects the shaft 164 to a horizontal shaft 170, turning in a bracket-arm 172 and in the forward extremity of the bracket 140. A jaw-clutch 174 allows the shaft 170, and therefore the reversing disk, to be driven under the control of the loading mechanism, the driving member of said clutch receiving power from the shaft of the distributor-drum by way of a chain of spur-gearing 176 (Fig. 1). A casing 178 surrounds the disk 156, the raceway passing through the inner head of said casing and terminating opposite the upper portion of the vertical inner disk-face. Arranged radially in this face of the disk, to be brought into registration with the extremity of the raceway in the rotation of said disk, are nail-receiving recesses 180, nine of these being provided in the present embodiment of the invention. Movable in each recess is a plunger or ejecting member 181 (Figs. 16 and 17), acted upon by a spring 182 situated between the plunger and a cover-plate attached to the outer face of the disk. Each of the plungers has an angular projection 183 extending outwardly over an annular cam-track 184 situated between the periphery of the disk and the interior of the casing. When any one of the recesses is alined with the end of the raceway 153, so that it may receive nails therefrom, the plunger 181 is held back by the engagement of its projection with the cam-track. This relation is maintained until the recess reaches the delivering position, which is removed from the end of the raceway by substantially 180 degrees. Here there is an abrupt fall in the cam, releasing the plunger and allowing it to be sharply thrown toward the inner face of the disk by its spring to eject the nail. Individual delivery of the nails from the raceway to the successive recesses is insured by a separator-bar 185 (Fig. 13) sliding in a horizontal slot at the extremity of the raceway, and being united to a bell-crank lever 186 fulcrumed upon the casing 178. A spring 187 exerts its tension upon an outer arm of the lever to hold the separator-bar normally across the raceway, said bar being removed to release the terminal nail by a contact member 188 projecting from the lever and resting against a cam 189 upon the shaft 158. There is a projection upon this cam for each of the recesses in the disk 156. These cam-projections act to withdraw the separator-bar when each recess is opposite the raceway, the bar then being released by the projection and permitted to be drawn by its spring sharply between the terminal nail and that succeeding it, so that the latter is not only retained, but the former positively forced into the recess in the disk by the contact of the bar.

Mounted upon the casing 178 is a casing 190, enclosing a delivery-disk 192 rotatable with the shaft 164. The periphery of this disk contains vertical recesses 194 equal in number to those of the disk 156 and uniformly spaced so that pairs of recesses in the two disks may be successively brought into registration. Against the under face of the disk 192 is held a nail-retaining and releasing shutter-plate 196 fastened upon a spindle 198 rotatable within the tubular shaft 164. A circular series of delivery-openings 200 about the outer portion of the shutter may be alined with the recesses 194, but are normally held out of registration by a spring 202 contained in an elongated opening 204 in the disk and extending between a pair of pins 206, 206, one of which depends from the disk and the other rises from the shutter. A pin 208 also projects downwardly from the disk 192 into a generally segmental slot 210 in the shutter. The length of the slot 210 is such as to permit the desired opening and closing movement of the shutter, the right-hand end of the slot, as viewed in Fig. 18 of the drawings, furnishing a stop-surface, which limits the rotation of the shutter under the action of the spring 202. The shutter is operated against the tension of the spring 202 through the agency of a cam-slot 212 formed in the side of the spindle 198 and acted upon by the loading device in a manner explained below.

The brackets 160 and 166 are joined at their lower ends by a cylindrical guide 214 (Figs. 13 and 14) for a loader-block 216, which causes and directs the delivery of nails from the distributing mechanism to the jacks. Connecting the distributing and loading mechanisms are tubes 218 terminating at their upper extremities in openings in a fixed plate 220, these openings being alined with the recesses 194 and shutter-openings 200 when these are in the delivering position. The lower ends of the tubes terminate in openings in a foot-plate 222 extending across the top of the guide-cylinder. From the foot-plate-openings depend vertical tubes 224 entering nail-tubes 226 arranged in openings in the loader-block to correspond to the normal position of the driver-tubes 62 of the jacks. The lower portions of the tubes 226 project somewhat below the under face of the loader-block, to enable them to project into the upper ends of the driver-tubes and so render more certain the delivery of nails thereto. In the normal raised position of the loader, it may be held latched by a spring-pressed detent 228 associated with a handle 230 secured at the lower front portion of the block 216, the detent, when the loader-block is raised, engaging a lug 232 upon the front of the casing 214. Preferably, the loader-block is counter-weighted at 234 so that it will tend to remain wherever it is moved vertically, and will require little effort on the part of the operator for its actuation. Upon the loader-block is a projection 236 entering the cam-slot 212. In the upward and downward travel of the loader-block, the projection 236 occupies a vertical portion of the cam-slot, so that no effect is produced upon the spindle 198. But when the tips of the loader-block-tubes are on the point of entering the passages 66 of the jack-tubes, the projection reaches the cam-portion of the slot, causing the rotation of the spindle and shutter against the tension of the spring 202. This brings the shutter-openings into alinement with the recesses in the delivery-disk, allowing the nails to be discharged and to pass through the tubes 218, 224 and 226 into the jack-passages, where they are held upon the drivers for the inserting operation. Extending circumferentially of the spindle, at the upper extremity of the cam-slot 212, is a groove 238. In this, the projection 236 is permitted to turn during the nail-collecting rotation of the delivery-disk 192.

To effect control of the distributing mechanism by the loader, there is fulcrumed at the top of the loader-guide 214 a lever 240, forked at its upper extremity to engage the bodily movable member of the clutch 174, this member being splined upon the shaft 170. At an intermediate point between its fulcrum and the clutch, the lever 240 carries a roll 242 arranged to enter a depression 244 (Fig. 16) in a flange 246 upon the lower portion of the delivery-disk. When the roll 242 is held in the disk-depression under the influence of a spring 248, the clutch is maintained disengaged, and the disk locked in the proper position to receive nails from the disk 156. When the roll rides upon the periphery of the flange, the clutch is held in engagement for one rotation of the disk, or until the depression 244 again reaches the roll, when the clutch is disengaged. Pivoted upon an upward extension 250 of the loader-block is a dog 252, held by a spring 254 with its end extending substantially horizontally. This end of the dog is arranged to contact with the lever 240 above its fulcrum, and to yield when the loader is moved down to make the nail-delivery. At such time, the lever 240, and therefore the clutch, is unaffected. Upon the upward idle movement of the loader, the dog engages an inclined edge 256 of the lever, swinging this to the right (Fig. 13) until the roll 242 is removed from the disk-depression and the clutch is engaged.

To trace a complete cycle of the distributing and loading mechanisms, the operator draws down the loader-block 216 by its handle 230, and, as the tubes 226 reach the driver-passages of the jack, the cam-groove 212 in the shutter-spindle produces alinement of the openings 200 in the shutter with the recesses 194 of the delivering disk. In these recesses a load of nails is held as a result of the previous operation, and thereupon falls through the connecting tubes to the driver-passages. When the operator again raises the loader-block to its normal position, the projection 252, acting upon the lever 240, unlocks the disk 192, and therefore the disk 156 which is geared to it, by the removal of the roll 242 from the depression 244, and effects the engagement of the clutch 174. Under the control of the raised portion of the disk-flange 246, the disks of the distributor perform a complete rotation. The separator-bar 185, actuated by the cam 189, picks off a nail from the end of the raceway when each of the successive recesses 180 is alined with said raceway. At this time, the cam-track 184 holds back the plunger 181 in this particular recess. When each recess which has thus received a nail has moved through 180 degrees, at which time the contained nail has been inverted and is in registration with one of the recesses 194 of the delivering disk, the cam-track releases the plunger, which is forced inwardly by its spring to eject the nail into the recess 194. After the collection of the complete load of nails has been made by a full rotation of the disk 192, the depression 244 again reaches the roll 242, which enters it, disengaging the clutch and locking the disks until the succeeding cycle.

Before starting the operation of the turret, which is followed, after 90 degrees of rotation, by the action of the operating mechanisms at stations B, C and D, it is desired that all the work-portions shall be properly positioned; that is, that there shall be a load of nails in the jack-passages 66, a shoe upon the jack, and a base and a lift in the holder-portions 98 and 100, respectively. To insure this, a lock is provided for the starting mechanism, which is capable of release only after each of the four actions just enumerated has been performed. The single rotation of the main shaft 28, under the influence of the clutch 27, this clutch or connecting means including the customary starting and stopping lever 258 (Figs. 9 and 10), is governed by a treadle-lever 260 moved to initiate the engagement of the clutch. As is most clearly illustrated in Fig. 8, the lever, when in its clutch-disengaging position, has, contacting with a lug 262 formed upon it, three locking arms 264, 266 and 268. The alinement of one or more of these arms with the lug will prevent movement of the lever 258. Consequently, all must be properly set before the machine can be started, and the performance of all the shoe-portion-supplying operations is necessary to permit such starting. When the loader-block 216 is lowered to make the nail-delivery to the jack, its bottom-surface, adjacent to the opening receiving the jack-rod 86, strikes the top of the jack-rod 84, releasing it from the frictional engagement of the inner retaining ball 88 and depressing it. Beneath the turret is fulcrumed a bell-crank lever 270, appearing in Fig. 9. A similar lever 272 co-operates with the jack-rod 86, this being better shown in Fig. 5. A generally horizontal arm of each of these levers enters a depression in the enlarged lower extremity of the corresponding rod. The rod 86 is pressed down by the engagement of the insole of the shoe S when this is forced upon the jack over the pins 78 and 80. The levers 270 and 272, each through an individual chain of elements consisting of a horizontally movable slide 274 (Fig. 5), bell-crank lever 276 (Fig. 8), against which the slide strikes, and a vertical link 278, respectively lower arms 280 and 282. The arm 280 is fast upon a shaft 284, to which is also fixed the locking arm 264. Surrounding this shaft is a sleeve 286 having secured to it the arms 282 and 266. Consequently, the depression of the arms 280 and 282 correspondingly lowers the locking arms 264 and 266, against the tension of springs 288, clear of the lug 262. Insertion of a base and lift between the levers 108 of the holder-portions 98 and 100, respectively, in each instance separates these arms and depresses the slide 116. As a result of this, the lever 120 first fulcrums upon one of the links 118, and then upon the other, lowering the slide 132 in two steps. When the turret is stopped and indexed by the bar 44, the slide 132 of the base and lift-holders, as a result of the advance of the jack from station A, will be vertically alined with a contact-surface 290 upon the enlarged end of an arm 292 (Figs. 2, 8 and 9), this arm being secured to one extremity of a shaft 294 rotatable in the base just below the turret. Bevel-gearing 296 connects the shaft 294 to a shaft 298 extending from front to rear of the base and having fast upon it an arm 300. A link 302 unites this arm with an arm 304 integral with the locking arm 268. Through the chain of elements just outlined, the application of either the base or lift to its holder moves the arm 268 partly down the surface of the lug 262, while the insertion of the other heel-portion continues this downward travel of the arm until, like the arms 264 and 266, it is below the plane of the lug. The lever 258 is now fully freed, and may be moved by the treadle 260 to start the machine. If an operator mistakenly applies the base and lift to both the holder which is at the rear of the jack at station A and to the proper holder which is in advance, the completion of the turret-movement through 90 degrees will bring the slide 132 of this second holder to the arm 292, which has already been acted upon. Were the end of the arm-portion carrying the contact-surface 290 vertical, this second lowered slide would produce interference and breakage by striking against it. I therefore provide an inclined end-surface 306, up which the slide rides and depresses the arm 292 to produce the desired unlocking effect upon the arm 268.

The jack, traveling from station A, stops beneath a pressure-head 308 (Fig. 3) arranged to slide vertically in a lateral extension of the frame-arm 14, this extension being supported by an upright 310 from the base 10. Fulcrumed at opposite sides of the head are bell-crank levers 312, 312, each carrying at its lower extremity a knife 314 provided at its inner side with an upwardly and outwardly inclined cutting edge. These knives move transversely of the path of revolution of the jacks, and their relation to each jacked shoe is such that, when the head is resting upon the heel-seat-portion of said shoe, the knives will sever the ends of the welt W (Fig. 5) and the adjacent corners of the sole s, and thus prepare said welt for proper co-operation with the breast-portion of the heel to be attached. From the head 308 is an upwardly extending tubular portion 316, which is guided in the frame, and movable in this portion 316 is an actuating plunger 318, which may also be tubular. Interposed between and within the head-extension and the plunger is a helical spring 320, acting by its expansive force to hold the plunger normally raised. Joined to the upper extremity of the plunger is the overhanging double arm or yoke of a vertical rod 322 articulated at its lower end to a lever 324 fulcrumed within the base. Arms 326, 326, projecting horizontally from the plunger near the point of connection of the rod 322 thereto, are united by links 328 to the upper arms of the bell-crank levers 312. At the inner extremity of the lever 324 is a roll 330 operating in a cam-groove in the face of a disk 332 (Fig. 4) secured upon the shaft 28.

The action of the mechanism at station B is as follows: After the turret has stopped at this station the jack, with the shoe applied at station A, the cam 332 draws down the rod 322, correspondingly depressing the plunger 318. This at first carries with it, through the spring 320, the head 308, without compressing the spring. The downward movement continues until the pressure-surface of the head comes in contact with the heel-seat-portion of the shoe, the locating pins 78 and 80 entering vertical openings in the pressure-head. Now, the travel of the rod continuing, the spring 320 is compressed, holding the shoe firmly upon the jack. At the same time, the arms 326, still descending, act through the links 328 to oscillate the bell-crank levers 312, carrying the knives 314 across the heel-seat, and severing the projecting ends of the welt at both sides of the shoe. The movement of the rod 322 is thereupon reversed, first restoring the knives to their normal position, and then elevating the head 308 to free the jacked shoe, the butting of the welt of which has been completed.

Station C has a pressure-head 334 forming a part of the base-nailing mechanism and carried at the bottom of a guide-rod 336 (Fig. 4) movable vertically in the frame-arm 14. Pivoted upon the head, at the rear, considered with reference to the advance of the jack, and extending at opposite sides below the pressure-face, are clamping members 338, 338 (Fig. 5), which are drawn toward each other by a spring 340 connecting the members. Between and at the rear of the clamping members is an abutment-face 342 extending vertically below the pressure-face of the head. As the holder 94 belonging to the jack traveling from station B approaches station C, the heel-holding portion 98 is in a vertical position, with the base H grasped between the surfaces 110 and held at such a height and relation radially of the turret that it will be carried just beneath the head 334 and between the clamps 338. It contacts with the curved forward ends of these clamps, causing them to yield against the tension of the spring 340; and when the breast-edge of the heel contacts with the abutment-surface 342, the circumferential movement of the base with the turret is checked, and the holder-portion 98 travels on, leaving the base grasped between the clamps, and with vertical positioning openings in it correctly alined with the locating pins 78 and 80 of the jack. As this occurs, the abutment-roll 104 of the base-holder yields, swinging down so that it is below the supporting surface of the holder, and is retained there by contact with the heel-seat-end of the clamped heel until the holder has passed the pressure-head, when it resumes its normal relation. Connected to the guide-rod 336 is an actuating lever 344, the fulcrum of which is furnished by a block 346 pivoted between links 348, 348, which are in turn pivoted upon the frame. The lever may yield upon this fulcrum by virtue of a spring 350 interposed between the top of the block 346 and an abutment-plug 352 threaded into the top of the lever. A screw 354 is carried by the lever beneath the block 346, and by adjustment of this screw and of the plug 352, the normal position of the lever and the resistance to compression of the spring, and thus the force with which the head 334 bears upon the work, may be varied. Depending from the lever 344 is a link 356 joined to a bell-crank lever 358 fulcrumed upon the base and having a roll 360 (Fig. 12) contacting with the periphery of a cam 362, and a roll 364 entering a cam-groove in a disk 366, both this disk and the cam 362 being fast upon the shaft 28 (Fig. 4). The peripheral surface of the cam 362 acts to impart to the lever 344 its working or pressure-stroke, while the cam-groove returns it to normal. When the turret has been positioned by the bar 44 at station C, the plunger 72 of the jack is alined with a ram or actuating member 368 guided in the base and connected at its lower extremity to the bell-crank lever 370 (Fig. 3) fulcrumed near the lower portion of the base. An upwardly extending arm of this bell-crank lever has upon it a roll 372 engaging the periphery of a cam 373 upon the shaft 28. After the pressure-head 334 has been lowered by its cam into engagement with the tread-end of the heel-base positioned upon the heel-seat of the shoe at station C, the ram 368 rises, forcing up the plunger 72, and consequently the drivers 68 within the tubes in the jack 60. The effect of the frictional resistance offered by the curved tubes to the passage of the drivers through them is to swing said tubes outwardly about their pivots 64, until they are arrested by the interior of the counter-portion of the shoe. To this, the curved tube-ends generally conform, so that openings of the driver-passages are placed in proximity to the rand-crease. There they are held by the thrust of the drivers during their nail-inserting action. The nails carried upon the upper ends of the drivers, as a result of the delivery by the loading mechanism at station A, are thus forced through the heel-seat of the shoe in an inwardly inclined direction, and into the heel-base, securing this in place. Because of this inward inclination of the nails, by virtue of the curvature of the nail-tubes and drivers, the nails may be inserted closely to the rand-crease without danger of breaking through the outer wall of the heel. A tight crease is thereby insured. The nails having been driven, the ram 368 is lowered by a roll 374 projecting from the bell-crank lever 370 and operating in a cam-groove in a disk 376 secured upon the shaft 28. The plunger 72 follows under the influence of gravity, restoring the drivers to their lowered positions.

Figure 3:
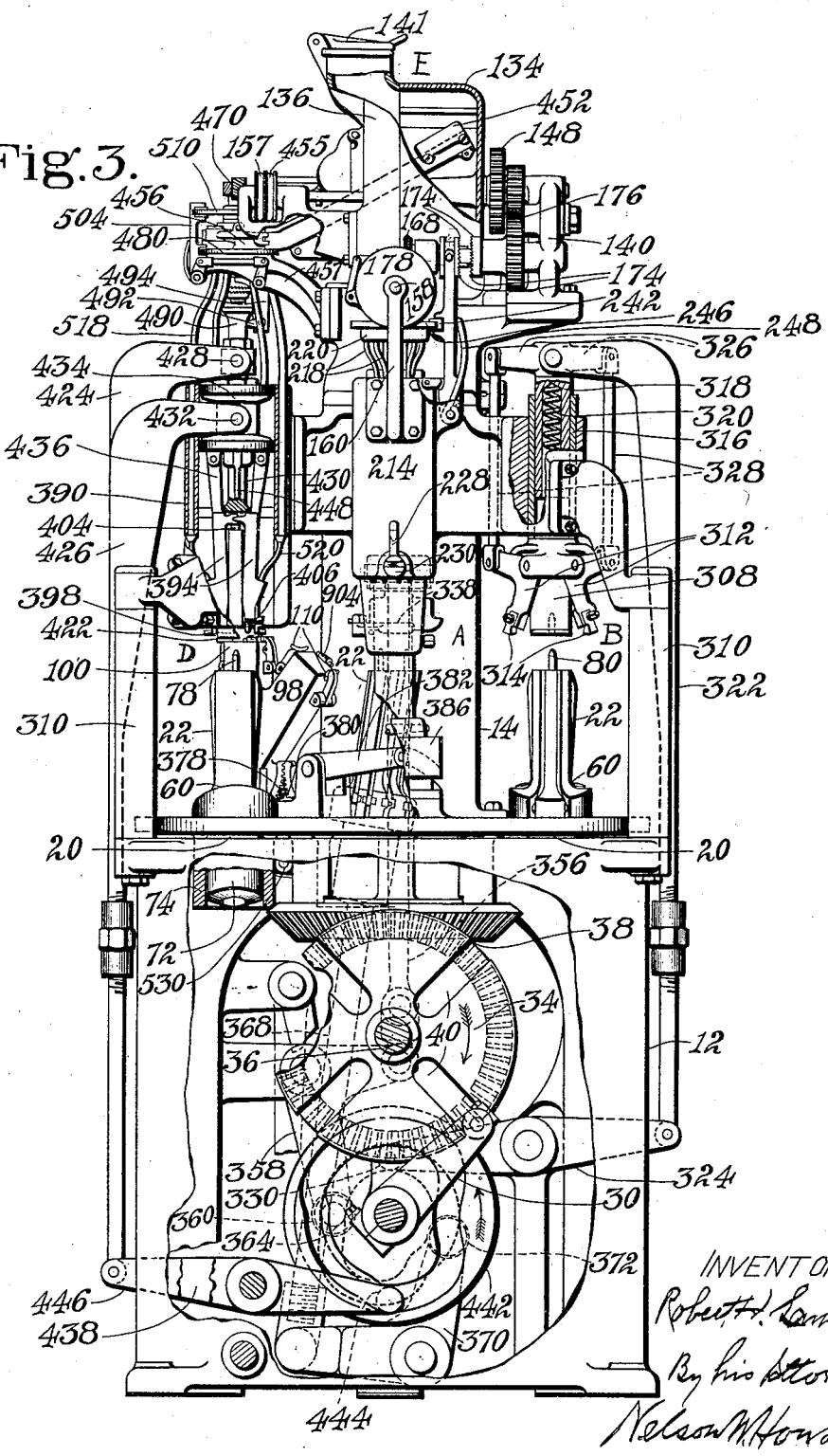
Fig. 3 shows the machine in front elevation, with parts broken away.

The holder 94 has formed upon or attached to it a gear-segment 378 (Figs. 4 and 5) meshing with a segment 380 upon one extremity of a lever 382 fulcrumed upon the upper face of the turret. At the outer extremity of this lever is a roll 384 extending into a cam-groove in a cylindrical member 386 fixed to the spindle 16 and extending through the center of the turret (Figs. 2 and 3). The groove, by its contour, maintains the holder-portion 98 in base-delivering position for station C, as already described, and, when the holder is passing between stations C and D, shifts the holder transversely of its path of revolution to bring the lift-holding portion 100 to a vertical position. The lift is thus delivered at station D to the mechanism by which it is nailed upon the base. This mechanism is in many respects like that disclosed in the application in my name for improvements in shoe machines, filed in the United States Patent Office June 5, 1924, Serial No. 718,058, this having matured on October 9, 1928, into Letters Patent No. 1,686,821.

In an extension of the frame-arm 14, similar to that at station B and supported at 310 in the same manner but opposite thereto, is a tubular guide 390, in which moves vertically a pressure-head 392 (Figs. 3, 19 and 20). This head is vertically slotted at its periphery to receive driver-carrying and nail-holding units furnished by tubes 394 and 395. There are, in the present instance, four of the tubes 394 arranged in pairs at opposite sides of the head, and one of the tubes 395 at the rear, or that portion farthest removed from the breast of the heel to be attached, though any suitable number may be employed. Their normal relation is as illustrated in Fig. 19; that is, drawn into the head-recesses, at which time their lower delivering ends approximately correspond to the nailing design of the smallest lift to be attached. The tubes 394 are supported by pivots at 396, and have at the lower extremity of each a contact or gage member 398, the inner face of which is spaced radially of the head from the delivery-openings of the tubes a distance equal to that between the periphery of the heel and the corresponding nail-receiving opening. Opposite pairs of the driver-tubes are geared at 400 to move together, being acted upon by a spring 402 located in a cylindrical recess at the center of the head and contacting at its upper extremity with a thimble 404, which it forces against the co-operating intermeshing tube-portions. This spring holds the tubes normally in, so their arrangement approaches the nailing design of the smallest lift, as already pointed out, permitting them to yield so that they may grasp and adapt themselves to all sizes. When a lift is thus in place between the gage members 398, nail-retaining nozzles 406 at the bottoms of the driver-tubes will be alined with the usual nail-receiving openings of the lift. Opposite sections of the nozzles are held in normal nail-retaining relation by springs 408, these being caused to temporarily hold in the driver-passages nails fed downwardly through delivering passages 412 by the distributing mechanism described below. Each tube 394 contains a reciprocatory driver 414 held in a member 416, which is guided in an enlarged upper bore of the tube. The tube 395 at the rear of the lift differs from the others in being without a connection at 400 and without the spring-actuation. Instead, there is a frictional connection at 418 between the tube and driver, which causes the tube to be swung out when the driver is drawn up, and back to lift-engaging relation when the driver descends. When thus moved outwardly to its normal position, the gage member 398 of the tube 395 is lifted clear of the lower pressure-surface of the head 392, leaving free a path by which a lift brought by the holder-portion 100 may enter between the side gages. In this entering travel, the lift is arrested for retention between the gages by an abutment furnished by a flange 422 depending from the forward edge of the head. Relieved of its lift, the holder-portion 100 passes on in the same manner as did the holder-portion 98 from station C, the cam 386 returning the latter portion to its vertical position before station A is reached.

For actuating the head and drivers, to clamp the lift upon the base and to insert the attaching nails, the following mechanism is provided: Reciprocating vertically at the side of the base adjacent to station D are two rods 424 and 426 (Figs. 3 and 19). Each has at its upper extremity a horizontally extending arm, that of the rod 424 being joined at 428 by a yoke 430 to the pressure-head 392. The arm of the rod 426 is, at 432, connected to a plunger 434 movable in the upper portion of the guide-cylinder 390. Links 436 unite the under side of the plunger to the respective drivers, the driving pressure being transmitted through blocks 437 interposed between the ends of the links and the heads of said drivers. The lower end of the rod 424 is articulated to a lever 438 fulcrumed within the base and having at its inner extremity a roll 440 operating in a cam-groove at the inner face of a disk 442 (Fig. 4) upon the shaft 28. A cam-groove in the opposite face of the disk receives a roll 444 upon a lever 446, to which the rod 426 is joined.

Starting in the position illustrated in Fig. 19, and with the lift-holding portion 100 associated with the jack under consideration brought to its delivering relation by the cam 386, the travel of the turret from station C to station D causes the holder to deliver its lift between the gages 398 of the side tubes 394, the rear tube 395 at this time being lifted by the elevation of its driver following the previous attaching operation. When the lift strikes the abutment 422, the holder travels from beneath it, the abutment-roll 104 being depressed in the same way as was that of the base-holding portion at station C. The lift is thus left grasped between the side gages 398; and the tube-nozzles 406, each containing a previously delivered nail, are vertically alined with the nail-receiving openings of said lift. The turret having stopped with the jack beneath the pressure-head 392 and having been indexed by its bar 44, the cam mechanism causes the rods 424 and 426 to travel down together at the same rate. By this, clamping pressure is applied to the lift through contact of the lower extremity of the head with the tread-surface of said lift, whereupon movement of the rod 424 stops, while that of 426 continues. As a result of this, the drivers are carried down through the now stationary tubes, the rear tube 395 first being swung in through its frictional connection 418 until its gage is in contact with the periphery of the heel. The drivers force through the nozzles 406 nails previously delivered thereto, the sections yielding to allow this, thus completing the attachment of the lift. In addition to the movable driver-tubes 394 and 395, the head 392 may contain, preferably adjacent to the abutment 422, one or more passages 448, in which operate drivers 449 secured in the plunger 434. These passages and drivers do not require adjustment, since their relation to the heel-breast may be unvarying for all sizes of heels. After the insertion of the nails, the rod 426 is first carried up by its cam to raise the drivers, this action on the tube 395 at the same time swinging said tube outwardly to clear the path for the entrance of the succeeding lift. Finally, the rods 426 and 424 travel up together to raise the pressure-head 392, freeing the work and restoring the lift-attaching mechanism to normal.

Passing now to the means for supplying nails to the passages 412 and 410, and referring particularly to Figs. 1, 3, 4 and 19 to 24, inclusive, there projects into the front of the fixed section 136 of the distributor-drum 134, a slotted raceway 450, between the opposite inclined receiving plates 452 of which nails are delivered from buckets 453 situated just in advance of the buckets 150, which supply the chute 153. The inclination of the buckets 453 to radii of the drum is greater than that of the buckets 150, so that the nails are longer retained and are carried past the receiving plate 152 for delivery to the plates 452. A rake-wheel 454, rotated by belt-gearing 455 from the shaft 154, maintains free movement of the nails in the raceway 450. This raceway delivers through a casing 456, supported upon a bracket 457 projecting from the frame-arm 14 at station D, to vertical recesses 458 uniformly spaced about the periphery of a nail-delivering disk 460. The disk 460 is mounted upon a tubular shaft 462 journaled vertically in the casing and having, held against rotation upon but movable along it, one element of a jaw-clutch 466. The other element of said clutch is fast upon a shaft 468 turning within the tubular shaft and driven by spiral gearing 470 from the drum-shaft 138. A cam-wheel 472, fixed upon the shaft 462, acts through a contact member 474, a lever 476 fulcrumed upon the casing and a co-operating spring 477, to reciprocate a nail-separator 478 across the end of the raceway. The action of this separator is like that of the separator 185 associated with the raceway 153. With the recesses 458 co-operates a nail-retaining and delivering shutter 480 capable of angular movement about the shaft 462, this being limited by contact of a pin 463 (Fig. 22) depending from the disk 460 with an end of a segmental slot 465 in the shutter. A series of openings 482 in the shutter may register with the recesses, but are normally held out of alinement therewith by a spring 484 extending between pins 486 projecting from the under side of the disk and the upper face of the shutter, and occupying a slot 488 in the disk.

The engagement of the clutch 466 is controlled in the operation of the head 392. For this purpose, there is carried upon the top of the yoke 430 a cam member 490, against which rests a contact member 492 pivoted upon a bell-crank lever 494 fulcrumed upon the bracket 457. A substantially horizontal arm of this lever is in the form of a yoke engaging the clutch member upon the shaft 462. When the head 392 moves down to apply pressure to the work, the inclined periphery of the cam 490 forces over the lever 496 against the tension of a spring 497. At the same time, an arm 498, secured upon the shaft of the bell-crank lever, acts through a link 500 and lever-arms 502 and 504 to remove a roll 506 from a depression 508 in a circular plate 510 fixed to the shaft 462. By this engagement, the disk 460 has been locked in position for the initiation of a cycle of operation, with one of the recesses 458 alined with the raceway 450. At the same time, the sections of the clutch 466 are held out of engagement. In the outward movement of the arm 504, a roll 512 upon it is carried out of a depression 514 in the periphery of the shutter. In this depression, the roll has been holding the shutter-openings 482 in registration with the recesses 458 against the force of the spring 484. Consequently, the disk is not only freed for rotation by the now-engaged clutch, but the shutter is allowed to assume its nail-retaining position. The contact of the roll 506 with the periphery of the plate locks the clutch to compel a complete turn of the disk, so its recesses collect a load of nails from the raceway under the control of the separator 478. At the end of the cycle of operation of this portion of the distributor, the depression 508 again reaches the roll 506, which enters it under the influence of the spring 497. Before it reaches the bottom of the depression, the roll 512 strikes the rearward inclined edge of the depression 514, which, upon release, was carried in advance of the depression 508 by the spring 484. This actuating engagement rotates the shutter back against the tension of the spring, so that the openings 482 are again alined with the recesses, and the collected load of nails is released. They are received by tubes 518 leading from openings in a fixed plate, over which the shutter moves. Descending these tubes, the nails pass through vertical conduits about the guide-cylinder 390, which conduits terminate at the upper extremity of slots through the wall of said cylinder. Curved outwardly from the passages 412 in the driver-units are tubes 520 having enlarged mouths 522. These mouths are of sufficient width so, at all times in the oscillation of the units, connection is maintained between the tubes 518 and 520. The time of action of the cam 519 upon the distributor is such that the just-described delivery of nails is made at the completion of the driving of a previously delivered load. As the drivers rise, the nails fall through the tubes until arrested by the nozzles 406, where they are supported for insertion in the next operation of the drivers. When the cam 490 rises after the completion of the nail-driving operation, the contact member 492 yields against a spring 524 (Fig. 21), so at this time no effect is produced upon the distributor-controlling lever 494.

During the next 90 degrees of rotation of the turret, the shoe upon the jack at station D passes to station A, and in this travel a lever 526 (Figs. 4 and 5) fulcrumed beneath the turret has its free end forced upwardly by the action of a cam-groove 528, formed in the frame-base, upon a roll 530 mounted upon the lever. The rising end of the lever, lying in a slot in the plunger 72 (Fig. 7), contacts with the lower extremities of the jack-rods 84 and 86. The upper ends of these rods, which, upon the application of the shoe to the jack, were carried to the level of the jack-top, are raised, lifting the heeled shoe from the pins 78 and 80. In the operations which have been performed, especially the attachment of the base, the work may have been brought into such close engagement with the pins that it would be difficult to remove it. The action of the lever 526 upon the rods completely frees the shoe so that when it arrives at station A it may be easily unjacked by the operator.

The operations occurring at all the stations having been hereinbefore described in detail, the action of the machine as a whole will be but briefly outlined. The operator, located at station A, first draws down the loader-block 216, thus delivering a load of nails N to the passages in the tubes 62 of the jack 22. These nails have been resting upon the shutter 196 of the distributor as a result of the previous operation, and now the release of the load from the shutter is followed by the collection, inversion and delivery of the succeeding load. These operations are initiated by the restoration of the loader-block to its raised position. The jack having received the nails to be driven, the operator places the shoe S upon the jack, locating it by the pins 78 and 80. He also inserts in the base and top-lift-holders on the arms 98 and 100 these respective heel-portions. When, and not until, these four acts—the delivery of the nails and the application of the shoe, base H and lift L—have been completed, the treadle 260 is unlocked. The operator may thereupon depress this treadle, and the machine starts in action. At station B, after the turret 18 has been stopped and exactly fixed in position, pressure is applied by the head 308 to clamp the heel-seat of the shoe upon the jack, and the ends of the welt W are trimmed or butted by the knives 314, 314 for alinement with the rear of the sole s. It is to be understood that, while this operation is occurring at station B, the operator is performing the just-indicated acts in connection with the succeeding jack at station A, and that at all four stations the operations peculiar to each are simultaneously occurring. Initiated by the succeeding depression of the treadle, the next movement of the jack first considered brings it to station C, and its holder 94, traveling in advance, has delivered a base to the pressure-head 334 at this station. Upon the descent of the head, the heel clamped thereon is seated upon the jack-pins and held firmly against the heel-seat, ready for nailing. This is accomplished by the elevation of the ram 368 beneath the jack-plunger, which lifts the drivers 68 and carries the nails, which are resting upon their ends, through the heel-seat of the shoe into the base. The head at station C then rises while the ram descends, and another 90 degrees of movement of the jack carries it to station D, a lift being delivered to the nailing mechanism at this station by the holder 94, which, between stations C and D, was shifted to carry the base-portion out of delivering position, and the lift-portion into such relation. There has, as a result of the previous operation of the machine, a load of nails been fed to the driver-units 394 and 395 of the lift-attaching head 392, resting between the yieldable sections of their nozzles 406. The action of the introduced lift upon the gages 398 carried by the units correctly locates these nozzles with reference to the points of insertion of the nails in the lift. The head of the nailing mechanism first descends to force the lift against the already attached base, the jack-pins projecting through said base to insure the correct positioning of the lift. Then the drivers 414 are actuated, downward movement of the rear driver bringing its previously raised tube 395, which gave a space for the introduction of the lift, into contact with said lift, to locate the nozzle. The drivers, striking the heads of the nails in the nozzles, insert them in the lift to complete its attachment to the base. In the pressure movement of the head, the distributor was tripped to supply a load of nails to the units for the next lift-attaching operation. The elevation of the drivers and head frees the work, and lifts the rear driver-tube clear of the path of entrance of the next lift. As the shoe with its heel completely attached travels from station D to station A, elevation of the jack-rods 84 and 86, which serve to control in part the unlocking of the treadle, restores them to their initial positions, and frees the work from the locating pins upon the jack, so the operator at station A finds it in condition for ready removal.

In a divisional application Serial No. 438,544, filed March 24, 1930, claims are presented covering the nail-distributing features disclosed herein. The present case contains claims generic to the invention which is the subject of the application filed in my name on May 21, 1931, Serial No. 538,963.

Having described my invention, what I claim as new and desire to secure by Letters Patent of the United States is:

1. In a shoe machine, a shoe-support movable to a plurality of operating positions, means for effecting such movement, means at one position for preparing the welt of a supported shoe for co-operation with a heel and means at another position for further operating upon the shoe.

2. In a shoe machine, a shoe-support movable to a plurality of operating positions, trimming mechanism operating upon a supported shoe at one position, and heel-attaching mechanism operating upon said shoe at a position succeeding the trimming position.

3. In a shoe machine, a shoe-support movable to a plurality of operating positions, means at one position for preparing the welt of a supported shoe for co-operation with a heel, and means at another position for applying the heel to the shoe.

4. In a shoe machine, a shoe-support movable to a plurality of operating positions, means at one position for preparing the welt of a supported shoe for co-operation with a heel, and heel-nailing means at another position.

5. In a shoe machine, a shoe-support movable to a plurality of operating positions, means at one position for preparing the welt of a supported shoe for co-operation with a heel, heel-base-attaching means at another position, and top-lift-attaching means at still a third position.

6. In a shoe machine, a rotatable turret, a plurality of jacks mounted upon the turret and movable thereby to a plurality of operating stations, driving means for causing the rotation of the turret, means actuated by the driving means for determining the positions of the jacks at the stations, cutting mechanism arranged to act successively upon jacked shoe at one station, and nailing mechanism arranged to act upon said shoes at another station.

7. In a shoe machine, a rotatable turret, a plurality of jacks mounted upon the turret and movable thereby to a plurality of operating stations, a welt-trimming mechanism co-operating with the jacks at one station, and heel-attaching mechanism co-operating with said jacks at another station.

8. In a shoe machine, a rotatable turret, and a plurality of jacks mounted upon the turret and movable thereby to a plurality of operating stations, succeeding stations being provided with welt-trimming mechanism, heel-base-nailing mechanism and lift-nailing mechanism co-operating with the jacks.

9. In a shoe machine, a revoluble work-support, and a welt cutter operating upon a supported shoe and movable transversely of its path of revolution.

10. In a shoe machine, a revoluble work-support, and opposite cutters movable toward and from each other across the path of revolution of the support.

11. In a shoe machine, a shoe-support, a pressure member movable into and out of engagement with the heel-seat of a supported shoe, welt-trimming means carried by the pressure member, and means for actuating the trimming means.

12. In a shoe machine, a shoe-support, a pressure member movable into and out of engagement with the heel-seat of a supported shoe, welt-trimming means carried by the pressure member, and means for moving the pressure member and having a continued movement to operate the trimming means.

13. In a shoe machine, a shoe-support, a pressure member movable into and out of engagement with the heel-seat of a supported shoe, welt-trimming means carried by the pressure member, a movable actuating member yieldably joined to the pressure member, and connections between the actuating member and trimming means.

14. In a shoe machine, a shoe-support, a pressure member movable into and out of engagement with the heel-seat of a supported shoe, welt-trimming means carried by the pressure member, members pivoted at opposite sides of the pressure member, a movable actuating member, a spring interposed between the actuating member and pressure member, and connections between said actuating member and trimming members.

15. In a shoe machine, a support arranged to move work to a plurality of positions for operation upon said work, and attaching mechanism provided with fastening-inserting means and movable with the support.

16. In a nailing machine, a jack movable to a plurality of operating positions, actuating mechanism for the jack, and nail-drivers movable in the jack.

17. In a shoe machine, a work-support movable to a plurality of operating positions, attaching mechanism movable with the support, and attaching mechanism situated at one of the operating positions, both of said attaching mechanisms being constructed and arranged to secure a shoe-portion as a part of a shoe-structure.

18. In a heel-attaching machine, a jack movable to a plurality of stations, means operable within a jacked shoe at one station to attach a heel-portion, and means operable outside said shoe at another station to attach another heel-portion.

19. In a heel-attaching machine, a jack movable to a plurality of stations, nail-drivers movable in the jack, means at one station for operating said drivers, and nail-driving mechanism situated at another station.

20. In a nailing machine, a movable turret, a plurality of work-supports movable by the turret through a plurality of stations, nail-driving mechanism associated with each work-support, and means at one operating station arranged to actuate the driving mechanism of all the work-supports.

21. In a heel-attaching machine, a rotatable turret, a plurality of jacks mounted upon the turret and each provided with nailing mechanism, means arranged to successively stop the rotation of the turret with each jack at a different operating station, and means at one of the stations for successively actuating the nailing mechanism of all the jacks.

22. In a shoe machine, a shoe-support movable through a plurality of operating positions, and means common to plural positions for supplying fastenings for utilization at the support.

23. In a shoe machine, a shoe-support movable through a plurality of operating positions, and means for successively supplying fastenings for utilization at the support in different operating positions.

24. In a shoe machine, a shoe-support movable through a plurality of operating positions, means for supplying fastenings to the shoe-support at one of the positions, and inserting mechanism at another position arranged to receive fastenings from the supplying means.

25. In a shoe machine, a shoe-support movable through a plurality of operating positions, means for supplying fastenings to plural positions, and means for reversing the fastenings supplied to one of the positions.

26. In a shoe machine, a shoe-support movable through a plurality of operating positions, operator-controlled means for supplying fastenings at one of the positions, and means controlled in the operation of the machine for supplying fastenings in another position.

27. In a shoe machine, a shoe-support movable through a plurality of operating positions, operator-controlled means for supplying fastenings at one of the positions, means controlled in the operation of the machine for supplying fastenings in another position, and means for reversing certain of the fastenings.

28. In a nailing machine, a jack movable to a plurality of operating positions, means for driving nails in a jacked shoe at plural positions, and a nail-distributor having connections to such positions.

29. In a nailing machine, a jack movable to a plurality of operating positions, means for driving nails in a jacked shoe at plural positions, a nail-distributor having connections to such positions, and a nail-reversing device included in the connections at one position.

30. In a nailing machine, a jack movable to a plurality of operating positions, means for driving nails in a jacked shoe at plural positions, a nail-distributor having connections to such positions, and a nail-loading device movable by the operator at one position and arranged to control the delivery of nails.

31. In a nailing machine, a jack movable to a plurality of operating positions, means for driving nails in a jacked shoe at plural positions, a nail-distributor having connections to such positions, a nail-loading device movable by the operator at one position and arranged to control the delivery of nails, and means at another position for controlling the nail-delivery in the operation of the machine.

32. In a heel-attaching machine, a rotatable turret, a plurality of jacks mounted upon the turret and movable through plural stations, nailing mechanism carried by each jack, nailing mechanism situated at one of the stations, a nail-receptacle, connections from the receptacle for delivering to the jacks, and connections from the receptable to the station nailing mechanism.

33. In a heel-attaching machine, a rotatable turret, a plurality of jacks mounted upon the turret and movable through plural stations, at one of which work-portions enter, nailing mechanism carried by each jack, nailing mechanism situated at one of the stations, a nail-receptacle, nail-loading mechanism at the entering station, connections from the receptacle to the loading mechanism, and connections from the receptacle to the station nailing mechanism.

34. In a heel-attaching machine, a rotatable turret, a plurality of jacks mounted upon the turret and movable through plural stations, nailing mechanism carried by each jack, nailing mechanism situated at one of the stations, a nail-receptacle, connections from the receptacle for delivering to the jacks, a nail-reversing device in said connections, and connections from the receptacle to the station nailing mechanism.

35. In a nailing machine, a traveling jack provided with nail-receiving passages, nail-distributing mechanism, nail-tubes leading from the distributing mechanism, and a loader having tubes arranged to receive the distributor-tubes and movable into the jack-passages.

36. In a heel-attaching machine, a jack, a movable heel-holding member co-operating therewith, nail-distributing mechanism, and means for controlling the distributing mechanism in the action of the heel-holding member.

37. In a heel-attaching machine, a jack, a movable pressure-head co-operating therewith, nail-distributing mechanism, a clutch through which the distributing mechanism is driven, and connections for controlling the clutch in the movement of the pressure-head.

38. In a heel-attaching machine, a jack, a movable pressure-head co-operating therewith, nail-distributing mechanism including a rotatable nail-receiving member and a nail-retaining and releasing member co-operating therewith, and connections for controlling the movement of the distributing members in the movement of the pressure-head.

39. In a heel-attaching machine, a jack, a movable pressure-head co-operating therewith, nail-distributing mechanism including a rotatable nail-receiving member and a nail-retaining and releasing member co-operating therewith, a clutch through which the distributing mechanism is driven, and connections for controlling the clutch and the operation of the retaining and releasing member in the movement of the pressure-head.

40. In a machine for operating upon shoes, a work-support movable to a plurality of operating positions and provided with a plurality of projections arranged to enter corresponding openings in shoe-portions and position such portions relatively to each other and to the support to receive the operations of the machine at plural positions, and means for presenting shoe-portions to the projections.

41. In a machine for operating upon shoes, a shoe-support movable to a plurality of positions and provided with a plurality of projections arranged to enter corresponding openings in shoe-portions and position such portions relatively to each other and to the support to receive the operations of the machine, and means at plural stations for presenting shoe-portions to the projections.

42. In a machine for operating upon shoes, a shoe-support movable to a plurality of positions and provided with a plurality of projections arranged to enter corresponding openings in shoe-portions and position such portions relatively to each other and to the support to receive the operations of the machine, means at plural stations for presenting shoe-portions to the projections, and means at plural positions for operating upon the positioned portions.

43. In a nailing machine, a jack movable to a plurality of operating stations and provided with a work-positioning projection, and nailing mechanism operating upon the positioned work at one of the stations.

44. In a nailing machine, a jack movable to a plurality of stations and provided with a work-positioning projection, and nailing mechanism individual to each of the plural stations operating upon the positioned work.

45. In a machine for operating upon shoe-heels, a rotatable turret, a plurality of jacks carried by the turret and each provided with positioning means constructed and arranged for successive co-operation with the heel-seat of a shoe and with a heel-portion, and means co-operating with the turret and arranged to present a shoe-portion for engagement with the positioning means.

46. In a machine for operating upon shoe-heels, a rotatable turret, a plurality of jacks carried by the turret and each being provided with a projection constructed and arranged to enter an opening in the heel-seat of a shoe, and means co-operating with the turret and arranged to present a heel-portion for engagement with the projection.

47. In a machine for operating upon shoe-heels, a rotatable turret, a plurality of jacks movable by the turret through a plurality of stations and each being provided with a projection constructed and arranged to enter an opening in the heel-seat of a shoe, means at a station arranged to present a heel-base for engagement with the projection, and means at another station arranged to present a top-lift for engagement with said projection.

48. In a shoe machine, a traveling work-support, a holder for work-portions traveling with the support, and means receiving the work-portions from the holder and presenting them to the support.

49. In a shoe machine, a traveling work-support, a holder for work-portions traveling with the support, and mechanism for operating upon the supported work and including means for receiving work-portions from the holder and presenting them to the support.

50. In a shoe machine, a jack, means for moving the jack to a plurality of operating positions, a holder for shoe-portions movable with the jack, and fastening-inserting mechanism including an element situated at an operating position and arranged to receive a shoe-portion from the holder.

51. In a shoe machine, a traveling work-support, a holder for a plurality of work-portions traveling with the support, and means separately receiving the work-portions from the holder and presenting them to the support.

52. In a shoe machine, a traveling work-support, a holder for a plurality of different kinds of work-portions traveling with the support, means separately receiving the work-portions from the holder and presenting them to the support, and means for moving the holder independently of its travel to effect such separate reception.

53. In a shoe machine, a jack, means for moving the jack to a plurality of operating positions, a holder for shoe-portions movable with the jack and transversely of such path of movement, and fastening-inserting mechanisms including elements situated at different operating positions and arranged to successively receive shoe-portions from the holder.

54. In a shoe machine, a jack, means for moving the jack to a plurality of operating positions, a holder for shoe-portions movable with the jack and independently movable, fastening-inserting mechanisms including elements situated at different operating positions and arranged to succesively receive shoe-portions from the holder, and means made effective in the travel of the holder for imparting thereto movement causing the separate reception.

55. In a heel-attaching machine, a rotatable turret, a plurality of jacks mounted on the turret and movable thereby to a plurality of stations, a heel-holder carried upon the turret with the jacks, and nailing mechanism having an element situated at a station for co-operation with the jacks and to which the holder delivers.

56. In a heel-attaching machine, a rotatable turret, a jack mounted thereon, a holder movable upon the turret and having a base-receiving portion and a top-lift-receiving portion, and means for moving the holder to deliver successively a base and a top-lift for attachment to a jacked shoe.

57. In a heel-attaching machine, a rotatable turret, a jack mounted thereon, a holder movable upon the turret and having a base-receiving portion and a top-lift-receiving portion, and means fixed relatively to the turret for moving the holder to deliver successively a base and a top-lift for attachment to a jacked shoe.

58. In a heel-attaching machine, a rotatable turret, a jack mounted thereon, a holder pivoted upon the turret and having a base-receiving portion and a top-lift-receiving portion, a cam situated near the axis of the turret, and connections for moving the holder from the cam.

59. In a heel-attaching machine, a traveling jack, a heel-holder traveling with the jack, and a pressure member into co-operation with which the jack moves in its travel and to which the holder delivers.

60. In a heel-attaching machine, a traveling jack, nailing mechanism operating in the jack, a heel-holder traveling with the jack, and a pressure member into co-operation with which the jack moves in its travel and to which the holder delivers.

61. In a heel-attaching machine, a traveling jack, a heel-holder traveling with the jack, and nailing mechanism including a pressure member into co-operation with which the jack moves in its travel and to which the holder delivers.

62. In a heel-attaching machine, a traveling jack, nailing mechanism operating in the jack, a holder having base and top-lift-receiving portions, said holder traveling with the jack and being movable independently of such travel, a pressure member and nailing mechanism into successive co-operation with which the jack moves in its travel, and means for moving the holder to cause it to deliver a base to the pressure member and a lift to the nailing mechanism.

63. In a heel-attaching machine, a traveling jack, a heel-holder traveling with the jack, and a pressure member provided with an abutment arranged to contact with a heel and remove it from the holder.

64. In a heel-attaching machine, a traveling jack, a holder traveling with the jack and having yieldable heel-engaging members, and a pressure member provided with an abutment arranged to contact with a heel and remove it from the holder with displacement of the yieldable members.

65. In a heel-attaching machine, a bodily movable holder provided with base and top-lift-receiving portions, and means for shifting the holder during its bodily movement to bring the portions successively into delivering position.

66. In a shoe machine, a shoe-support, and operating mechanism movable upon the support and including a carrier provided with a passage varying in the direction of longitudinal extension and a flexible tool consisting of an integral member movable longitudinally of the passage.

67. In a shoe machine, a shoe-support, operating mechanism movable upon the support and including a carrier provided with a passage varying in the direction of longitudinal extension and with a flexible tool movable longitudinally of the passage, said tool frictionally engaging the interior of the passage at the portion of changing direction, and means for moving the tool longitudinally of the passage, its frictional engagement moving the carrier upon the support.

68. In a fastening-inserting machine, a shoe-support, a fastening-receiving tube bent at its end toward the axis of the support and mounted on said support to move toward and from the axis, and a flexible fastening-inserting member operating in the tube and arranged to move said tube.

69. In a shoe machine, a shoe-support, operating mechanism movable upon the support and including a carrier provided with a passage varying in the direction of longitudinal extension and a tool consisting of an integral member provided with an operating extremity and a portion of reduced diameter adjacent to such extremity, and means for moving the tool longitudinally of the passage.

70. In a shoe machine, a shoe-support, operating mechanism movable upon the support and including a carrier provided with a passage varying in the direction of longitudinal extension and a tool provided with an operating extremity and a portion of reduced diameter adjacent to such extremity, an actuating member, and connections between the tool and actuating member permitting rotation of said tool in the passage.

71. In a heel-attaching machine, a jack, driver-tubes movable upon the jack and having ends curved to conform generally to the counter-portion of a jacked shoe, and drivers arranged to reciprocate in the tubes and to move said tubes.

72. In a heel-attaching machine, a jack, driver-tubes movable upon the jack and having ends curved to conform generally to the counter-portion of a jacked shoe, and drivers consisting of integral rods arranged to reciprocate in the tubes and having portions of reduced diameter operating at the point of curvature.

73. In a heel-attaching machine, a jack-body having peripheral recesses, driver-tubes pivoted in the recesses and provided with curved passages, and flexible drivers arranged to reciprocate in the passages, the driver-tubes being free for movement under the influence of the drivers.

74. In a heel-attaching machine, a jack-body having peripheral recesses, driver-tubes pivoted in the recesses and provided with curved passages, a reciprocatory plunger, flexible drivers situated in the passages and provided with reduced portions, and universal joints connecting the plunger and drivers.

75. In a heel-attaching machine, a frame, a turret rotatable thereon, a jack mounted upon the turret, drivers movable in the jack, and a driver-actuating plunger into co-operation with which the jack is revolved by the turret.

76. In a heel-attaching machine, a frame, a turret rotatable thereon, a jack mounted upon the turret, drivers movable in the jack, actuating means for the drivers mounted upon the frame, a pressure-head movable upon the frame into and out of contact with jacked work, and means for operating the driver-actuating means and pressure-head in timed relation.

77. In a heel-attaching machine, a frame, a turret rotatable thereon, a jack mounted upon the turret, drivers movable in the jack, and a driver-actuating plunger and pressure-head for the work into co-operation with which the jack is revolved by the turret.

78. In a heel-attaching machine, a frame, a jack mounted thereon, drivers arranged to reciprocate in the jack, a guide member movable in the frame and carrying a pressure-head co-operating with the jack, a lever fulcrumed upon the frame and connected to the guide member, and means for oscillating the lever.

79. In a heel-attaching machine, a frame, a jack mounted thereon, drivers arranged to reciprocate in the jack, a guide member movable in the frame and carrying a pressure-head co-operating with the jack, a lever yieldably fulcrumed upon the frame and connected to the guide member, and means for oscillating the lever.

80. In a heel-attaching machine, a jack, drivers arranged to reciprocate therein, a pressure-head co-operating with the jack, and heel-holding means carried by the head.

81. In a heel-attaching machine, a jack, a pressure-head co-operating therewith, a driver movable in the head, and means for moving the head and driver together, said means being arranged to also move one of the elements independently of the other.

82. In a heel-attaching machine, a jack, a pressure-head co-operating therewith, a driver movable in the head, and means for moving the head and driver together toward the jack, said means being arranged to thereafter move the driver independently.

83. In a heel-attaching machine, a jack, a pressure-head co-operating therewith, a driver movable in the head, and means for moving the head and driver together toward and from the jack, said means being arranged to move the driver independently after such joint movements toward and from the jack.

84. In a heel-attaching machine, a pressure-head, a plurality of driver-units each supported near one end and arranged at the opposite end for engagement with the work, and means acting constantly to force the work-engaging ends inwardly toward the axis of the head.

85. In a heel-attaching machine, a head, a plurality of driver-units each supported near one end and arranged at the opposite end for engagement with the work, means acting constantly to force the work-engaging ends inwardly toward the axis of the head, and gage members carried by the units and arranged to contact with the periphery of a heel.

86. In a heel-attaching machine, a head, a plurality of driver-units each supported near one end and arranged at the opposite end for engagement with the work, and expansion means interposed between the head and units.

87. In a heel-attaching machine, a head, a plurality of driver-units each supported near one end and arranged at the opposite end for engagement with the work, means for connecting a plurality of the units to move together, and a spring acting upon the connecting means.

88. In a heel-attaching machine, a head, a plurality of driver-units each supported near one end and arranged at the opposite end for engagement with the work, intermeshing projections from the supporting ends of the units, and a spring interposed between said projections and the head.

89. In a heel-attaching machine, a traveling heel-holder, nailing mechanism provided with movable members arranged to engage a heel, and means for moving a member out of the path of the heel.

90. In a heel-attaching machine, a traveling heel-holder, nailing mechanism provided with movable members arranged to engage a heel, and means for moving a member out of the path of the heel and for returning said member into engagement with the heel.

91. In a heel-attaching machine, a rotatable turret, a jack and a heel-holder mounted thereon, nail-driving mechanism into co-operation with which the holder and then the jack is moved by the turret and including a driver-tube movable into the path of a heel in the holder, and means for carrying the tube clear of said path for the delivery of a heel from the holder to the driving mechanism.

92. In a heel-attaching machine, a rotatable turret, a heel-holder mounted thereon, and nailing mechanism including driver-tubes urged constantly toward the path of a heel in the holder and a driver-tube held normally out of said path.

93. In a heel-attaching machine, a rotatable turret, a heel-holder mounted thereon, nailing mechanism including driver-tubes urged constantly toward the path of a heel in the holder and a driver-tube held normally out of said path, and means for carrying the last-mentioned tube into contact with the heel upon the operation of the nailing mechanism.

94. In a heel-attaching machine, a traveling heel-holder, and a co-operating nailing head provided with an abutment arranged for contact with a heel to remove it from the holder.

95. In a heel-attaching machine, a traveling heel-holder, and a co-operating nailing head provided with an abutment arranged for contact with a heel in the holder and situated at the side of the head farthest from the approaching holder.

96. In a heel-attaching machine, a traveling heel-holder, a co-operating nailing head provided with an abutment arranged for contact with a heel in the holder and situated at the side of the head farthest from the approaching holder, and members yieldable upon the head for contact with the sides of a heel.

97. In a heel-attaching machine, a traveling heel-holder, a co-operating head provided with an abutment arranged for contact with a heel in the holder, and driver-tubes movable in the head and having gage-portions for contact with a heel.

98. In a heel-attaching machine, a pressure-head, nail-driving units carried thereby, means for moving certain of the units under the influence of the driving action, and a spring for moving other units.

99. In a heel-attaching machine, a pressure-head having a driver-passage formed therein, a driver operating in the passage, and driver-units movable upon the head.

100. In a heel-attaching machine, a pressure-head having a driver-passage formed therein, a driver operating in the passage, driver-tubes movable upon the head, a driver movable in one tube, frictional connections between said driver and its tube and being arranged to move said tube, and a spring acting to move another tube.

101. In a nailing machine, a pressure-head having nail-conduits formed therein, and driver-units movable in the head and having tubes provided with nail-receiving mouths movable beneath the delivery-ends of the conduits.

102. In a shoe machine, operating mechanism, actuating mechanism therefor, means for supporting a plurality of shoe-parts for the operation of the machine, and means for preventing effective connection of the actuating and operating mechanisms until such plural parts are in place in the supporting means.

103. In a shoe machine, operating mechanism, actuating mechanism therefor, means including an element movable by the operator for connecting the actuating mechanism to the operating mechanism, means for supporting a plurality of shoe-parts for the operation of the machine, and means for preventing movement of the connecting element until such plural parts are in place upon the supporting means.

104. In a shoe machine, operating mechanism, actuating mechanism therefor, means including an element movable by the operator for effecting the connection of the actuating mechanism to the operating mechanism, means for supporting a plurality of shoe-parts for the operation of the machine, a locking member corresponding to each of such plural parts and co-operating with the connecting element, and means acting in the supply of the parts to their supports for effecting the release of the connecting element from all the locking members.

105. In a shoe machine, operating mechanism, actuating mechanism therefor, means including an element movable by the operator for connecting the actuating mechanism to the operating mechanism, means for supporting a plurality of shoe-parts for the operation of the machine, a movable locking member co-operating with the connecting element, and means acting in the supply of each of the plural parts to their supports to partially move the locking member to effect the release of the connecting element.

106. In a shoe machine, a shoe-support, a support for a part to be applied to a shoe-bottom, operating mechanism associated with the supports, actuating mechanism for the operating mechanism and including a starting member, and locking members for the starting member controlled by the application of a shoe and of a bottom-part to their supports.

107. In a fastening-inserting machine, a jack, means for supplying fastenings for insertion in a jacked shoe, inserting means, actuating means therefor, and locking members for the actuating means controlled respectively by the application of a shoe to the jack and by the delivery of the fastenings.

108. In a heel-attaching machine, a jack, a heel-holder, nail-supplying means, nail-driving mechanism, actuating means therefor, and locking means for the actuating means controlled by the application of a shoe to the jack and a heel to the holder and by the supply of nails.

109. In a heel-attaching machine, a jack, a base-holder, a top-lift-holder, nail-driving mechanism, actuating means therefor, and locking means for the actuating means controlled by the application of a shoe to the jack and a base and top-lift to their respective holders.

110. In a heel-attaching machine, a jack, a base-holder, a top-lift-holder, nail-driving mechanism, actuating means therefor, and a locking member for the actuating means movable by the application of a base to its holder to effect a partial movement of said locking member to release the connecting member and by the application of a top-lift to its holder to effect another portion of the movement.

111. In a shoe machine, a work-support, means for operating upon the supported work, actuating means for the operating means, said actuating means being under the control of the operator, and a member movable in the application of the work to the support and arranged to permit such control of the actuating means.

112. In a shoe machine, a work-support, means for operating upon the supported work, actuating means for the operating means, and a plurality of members movable in the application of different work-portions to the support and arranged to jointly control the actuating member.

113. In a heel-attaching machine, a jack, nailing mechanism, actuating mechanism for the nailing mechanism, a member movable upon the jack by contact with a shoe to be heeled, and connections to said member arranged to control the actuating mechanism.

114. In a heel-attaching machine, a jack, nailing mechanism, nail-supplying mechanism, actuating mechanism for the nailing mechanism, a member movable by contact with the nail-supplying mechanism, and connections to said member arranged to control the actuating mechanism.

115. In a heel-attaching machine, a jack, driving devices carried by the jack, actuating mechanism for the driving devices, mechanism for supplying to the jack the nails to be driven, a member movable upon the jack by contact with the nail-supplying mechanism, and connections to said member arranged to control the actuating mechanism.

116. In a shoe machine, a jack, a rod movable longitudinally of the jack, mechanism for operating upon a jacked shoe, clutch mechanism for transmitting power to the operating mechanism, and connections arranged to control the clutch mechanism in the movement of the rod.

117. In a shoe machine, a jack, a plurality of rods movable longitudinally of the jack, mechanism for operating upon a jacked shoe, clutch mechanism for transmitting power to the operating mechanism, and connections acted upon by the plural jack-rods to control the clutch mechanism.

118. In a shoe machine, a work-support movable to a plurality of operating positions at one of which a work-portion is applied to the support, mechanism for operating upon the work at another position, actuating mechanism for the operating mechanism, a member movable upon the support in the application of the work thereto, a member situated adjacent to the path of the support-member and movable thereby, and connections arranged to control the actuating mechanism in such movement.

119. In a shoe machine, a rotatable turret, a work-support mounted upon the turret and movable thereby to a plurality of stations, operating mechanism at a station, actuating mechanism for the operating mechanism, and a member associated with the support and arranged to control the actuating mechanism.

120. In a shoe machine, a rotatable turret, a work-support mounted upon the turret and movable thereby to a plurality of stations, operating mechanism at a station, actuating mechanism for the operating mechanism, a contact member positioned upon the support in the application of work thereto, a controlling member into registration with which the contact member is carried by the turret, and connections from the controlling member to the actuating mechanism.

121. In a shoe machine, a rotatable turret, a jack mounted on the turret and movable thereby to a plurality of stations, operating mechanism at a station, actuating mechanism for the operating mechanism, a plurality of contact members positioned upon the jack in the application of work thereto, corresponding controlling members into registration with which the contact members are carried by the turret, and connections effective to permit starting the actuating mechanism only when all the contact members have been positioned.

122. In a shoe machine, a work-support, operating means associated therewith, actuating means for the operating means, work-grasping members mounted upon the support, and a contact member movable by the grasping members and arranged to control the actuating means.

123. In a shoe machine, a work-support, operating means associated therewith, actuating means for the operating means, work-grasping means mounted upon the support, a contact member movable by the grasping means in successive steps, and connections to the actuating means controllable by the contact member only after it has been moved a plurality of steps.

124. In a heel-attaching machine, a heel-support including a base-holding portion and a top-lift-holding portion, grasping members separated by the introduction of the heel-portions to the holders, a slide movable under the joint influence of the grasping members of both holders, nailing mechanism, actuating mechanism therefor, and connections controlling the actuating mechanism after movement of the slide by both sets of grasping members.

125. In a heel-attaching machine, a heel-support including a base-holding portion and a top-lift-holding portion, grasping members separated by the introduction of the heel-portions to the holders, a lever movable by both sets of grasping members, a contact member connected to the lever, nailing mechanism, actuating mechanism therefor, and connections to the actuating mechanism controlled by the contact member.

126. In a shoe machine, operating mechanism, actuating mechanism therefor, a support provided with plural holders having engaging members for heel-portions and being pivotally mounted to allow the presentation of different heel-portions to the operating mechanism, and connections between the engaging members and actuating mechanism including an element rotatable about the pivot of the support.

127. In a shoe machine, operating mechanism, actuating mechanism therefor, a support provided with plural holders having engaging members for heel-portions and being pivotally mounted to allow the presentation of different heel-portions to the operating mechanism, a slide movable in the support by engaging members of both holders, a contact-slide mounted adjacent to the support, gearing rotatable about the pivot of the support and joining the slides, and connections between the contact-slide and actuating mechanism.

128. In a shoe machine, a work-support, a member associated with the support and being movable to control the operation of the machine, and means arranged to move the member to vary the relation of the work to the support.

129. In a shoe machine, a work-support, a member associated with the support and being movable to control the operation of the machine, and means arranged to move the member to free the work from the support.

130. In a shoe machine, a work-support, a member associated with the support and being movable in the application of work to the support, and means for moving the member to free the work from the support.

131. In a shoe machine, a jack, a rod movable longitudinally of the jack and normally projecting above the heel-seat-portion thereof, said rod being depressed when a shoe is jacked, and means for projecting the rod upon the completion of a cycle of the machine.

132. In a shoe machine, a work-support, members carried by the support and arranged to be moved successively by the application of different work-portions to said support, and means acting in the operation of the machine to move said members simultaneously.

133. In a heel-attaching machine, a jack, nail-supplying mechanism co-operating therewith, two rods successively movable longitudinally of the jack in the supply of nails to said jack and in the jacking of a shoe, and means for moving such rods simultaneously to free a heeled shoe from the jack.

134. In a shoe machine, a jack provided with work-locating means, and means movable against the work to free it from engagement with the locating means.

135. In a heel-attaching machine, a jack provided with locating devices arranged for co-operation with the heel-seat of a shoe and with a heel, and means movable against the heel-seat to free the work from engagement with the locating devices.

136. In a heel-attaching machine, a jack provided with projections arranged to enter openings in the heel-seat of a jacked shoe and in a heel, and means movable against the heel-seat to free the heeled shoe from engagement with the projections.

137. In a shoe machine, a traveling work-support, a member movable to free work from the support, and means acting in the travel of the support to move the member.

138. In a shoe machine, a rotatable turret, a jack mounted thereon, a member movable to free the work from the jack, and means acting in the rotation of the turret to move the member.

139. In a shoe machine, a rotatable turret, a jack mounted thereon, a rod movable longitudinally of the jack, a lever fulcrumed upon the turret and contacting with the rod, and a cam for actuating the lever.

140. In a shoe machine, a shoe-support movable to a plurality of operating positions, means at one position for trimming the outsole of a supported shoe, and means at another position for further operating upon the shoe.

141. In a shoe machine, a shoe-support, a plurality of fastening-inserting mechanisms arranged to act successively upon a supported shoe, and means common to plural inserting mechanisms for supplying fastenings thereto.

142. In a heel-attaching machine, a jack, a plurality of nailing mechanisms arranged for successive co-operation with the jack, and a distributor supplying nails to plural nailing mechanisms.

143. In a heel-attaching machine, a jack, a base-nailing mechanism co-operating with the jack, a lift-nailing mechanism co-operating with the jack, a nail-distributor, and means for operating the distributor to supply nails to both the base-nailing mechanism and the lift-nailing mechanism.

144. In a shoe machine, a shoe-support provided with a projection arranged to enter corresponding openings in shoe-portions and position such portions relatively to each other and to the support, a plurality of fastening-inserting mechanisms co-operating with the support, and means for operating the mechanisms to successively insert fastenings in the positioned work.

145. In a heel-attaching machine, a jack provided with a plurality of work-positioning projections, base-nailing mechanism and a lift-nailing mechanism successively co-operating with positioned work, and means for operating the two mechanisms to attach successively a base and a lift.

146. In a heel-attaching machine, a jack, a rotatable turret, sets of drivers mounted upon the turret and co-operating with the jack, and a driver-actuating member into co-operation with which the sets of drivers are revolved by the turret.

In testimony whereof I have signed my name to this specification.

ROBERT H. LAWSON.